US 10,191,082 B1
Jan. 29, 2019

(12) United States Patent
Kley

(10) Patent No.: US 10,191,082 B1
(45) Date of Patent: Jan. 29, 2019

(54) CARBON NANOTUBE PROBES AND STRUCTURES AND METHODS OF MEASUREMENT

(76) Inventor: Victor B. Kley, Berkeley, CA (US)

( * ) Notice: Subject to any disclaimer, the term of this patent is extended or adjusted under 35 U.S.C. 154(b) by 513 days.

(21) Appl. No.: 12/023,006

(22) Filed: Jan. 30, 2008

Related U.S. Application Data

(60) Provisional application No. 60/898,495, filed on Jan. 30, 2007, provisional application No. 60/938,616, filed on May 17, 2007.

(51) Int. Cl.
G01Q 70/12 (2010.01)
G01Q 70/06 (2010.01)

(52) U.S. Cl.
CPC .............. *G01Q 70/12* (2013.01); *G01Q 70/06* (2013.01)

(58) Field of Classification Search
CPC ........ G01Q 70/12; G01Q 70/02; G01Q 70/06; Y10S 977/743; Y10S 977/752; B82Y 35/00
USPC ...................................... 850/58, 59
See application file for complete search history.

(56) References Cited

U.S. PATENT DOCUMENTS

| 4,561,731 | A | 12/1985 | Kley |
| 5,283,442 | A | 2/1994 | Martin et al. |
| 5,347,884 | A | 9/1994 | Garnjost et al. |
| 5,574,278 | A * | 11/1996 | Poirier .................. G01Q 20/04 250/307 |
| 6,144,028 | A | 11/2000 | Kley |
| 6,169,281 | B1 | 1/2001 | Chen et al. |
| 6,229,138 | B1 | 5/2001 | Kley |
| 6,232,597 | B1 | 5/2001 | Kley |
| 6,242,734 | B1 | 6/2001 | Kley |
| 6,265,711 | B1 | 7/2001 | Kley |
| 6,281,491 | B1 | 8/2001 | Kley |
| 6,323,483 | B1 * | 11/2001 | Cleveland ............ G01Q 10/04 250/307 |
| 6,337,479 | B1 * | 1/2002 | Kley ....................... G11B 9/14 250/234 |
| 6,339,217 | B1 | 1/2002 | Kley |
| 6,369,379 | B1 | 4/2002 | Kley |
| 6,396,054 | B1 | 5/2002 | Kley |
| 6,515,277 | B1 | 2/2003 | Kley |
| 6,874,668 | B2 * | 4/2005 | Cumings ............... B82Y 30/00 225/3 |
| 7,045,780 | B2 * | 5/2006 | Kley ....................... G11B 9/14 250/306 |
| 7,238,425 | B2 * | 7/2007 | Cumings ............... B82Y 30/00 428/403 |

(Continued)

OTHER PUBLICATIONS

Dong, L., et al., "Towards Nanotube Linear Servomotors" IEEE Transactions on Automation Science and Engineering, vol. 3, No. 3, Jul. 2006.*

(Continued)

*Primary Examiner* — Wyatt Stoffa
(74) *Attorney, Agent, or Firm* — Kilpatrick Townsend & Stockton LLP

(57) ABSTRACT

A carbon nanotube or similar structure is used as the final end tip structure in a Scanning Probe Microscope to measure, modify or identify material and reentrant structures in typical recesses or very small recesses. Further the nanotube or similar structure is acoustically driven such that its locus of motion forms a dynamic reentrant probe. The nanotube is calibrated by known vertical or reentrant structures.

22 Claims, 26 Drawing Sheets

(56) References Cited

U.S. PATENT DOCUMENTS

| | | | | |
|---|---|---|---|---|
| 8,060,943 B1* | 11/2011 | Popescu | ............... | G01Q 70/12 73/105 |
| 2002/0070426 A1* | 6/2002 | Cumings | ............... | B82Y 30/00 257/613 |
| 2002/0121131 A1* | 9/2002 | Mancevski | ............ | G01Q 60/26 73/105 |
| 2004/0134265 A1* | 7/2004 | Mancevski | ............ | G01Q 60/26 73/105 |
| 2004/0211271 A1* | 10/2004 | Han | ............... | B82Y 15/00 73/866.5 |
| 2005/0017171 A1* | 1/2005 | Samuelson | ............ | B82Y 15/00 250/306 |
| 2005/0103993 A1* | 5/2005 | Guillorn | ............... | B82Y 15/00 250/306 |
| 2005/0147981 A1* | 7/2005 | Yamakawa | .......... | C12Q 1/6874 435/6.16 |
| 2006/0057383 A1* | 3/2006 | Cumings | ............... | B82Y 30/00 428/403 |
| 2007/0033992 A1* | 2/2007 | Han | ............... | B82Y 15/00 73/105 |
| 2007/0114880 A1* | 5/2007 | Zettl | ............... | B82Y 10/00 310/309 |
| 2008/0000773 A1* | 1/2008 | Lee | ............... | C25D 1/12 204/471 |
| 2008/0060426 A1* | 3/2008 | Bevis | ............... | G01Q 60/38 73/105 |
| 2008/0135750 A1* | 6/2008 | Kley | ............... | B82Y 35/00 250/306 |
| 2008/0138577 A1* | 6/2008 | Sheehan | ............... | B81B 3/0075 428/141 |
| 2009/0106869 A1* | 4/2009 | Park | ............... | B82Y 15/00 850/60 |
| 2009/0297422 A1* | 12/2009 | Zuo | ............... | C01B 32/168 423/290 |
| 2010/0096265 A1* | 4/2010 | Colbert | ............... | B82Y 10/00 204/450 |
| 2010/0173422 A1* | 7/2010 | Koley | ............... | G01N 29/022 436/149 |
| 2010/0301734 A1* | 12/2010 | Suh | ............... | B82Y 30/00 313/310 |
| 2010/0304215 A1* | 12/2010 | Suh | ............... | B82Y 30/00 429/209 |
| 2011/0024697 A1* | 2/2011 | Biris | ............... | C01B 31/0233 252/511 |
| 2011/0121496 A1* | 5/2011 | Mickelson | ............... | B82B 3/00 264/479 |
| 2012/0159678 A1* | 6/2012 | Lyding | ............... | B82Y 35/00 850/57 |

OTHER PUBLICATIONS

"Rigid." Merriam-Webster.com. Merriam-Webster, n.d. Web. Dec. 28, 2017.*

Zhang, W., Xi, Z., Zhang, G., Li, C., & Guo, D. (2008). Multiple telescoping extension of multiwalled carbon nanotubes and its application in atomic force microscopy. The Journal of Physical Chemistry C, 112(38), 14714-14717.*

* cited by examiner

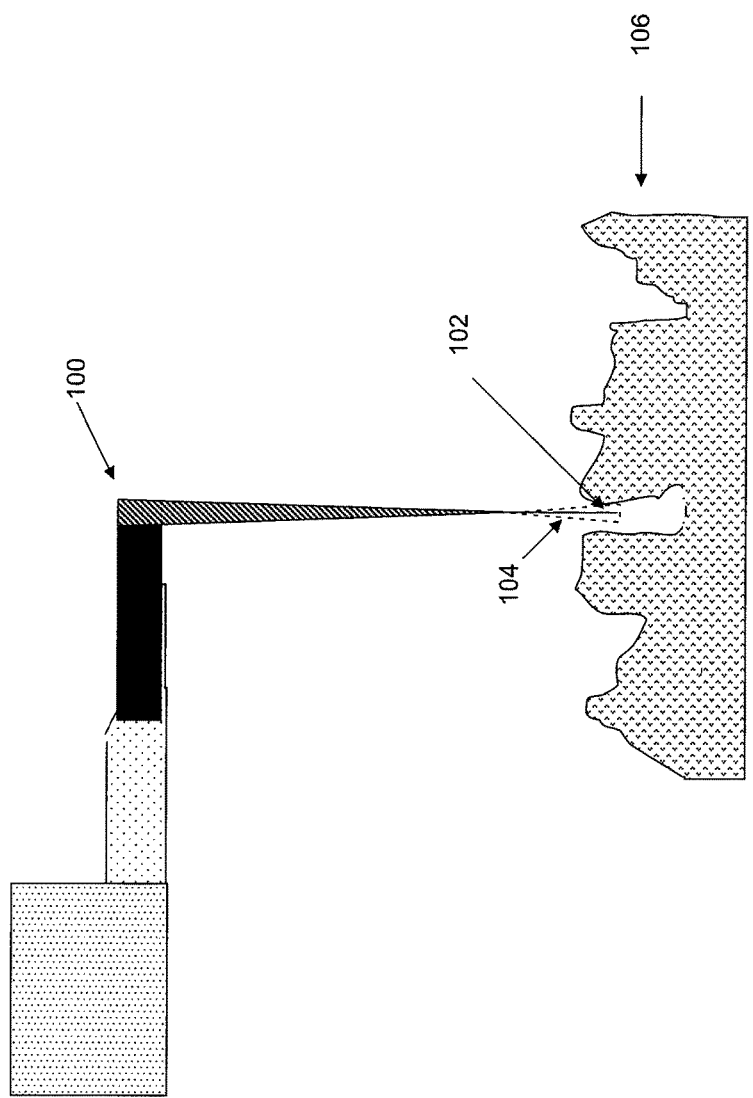

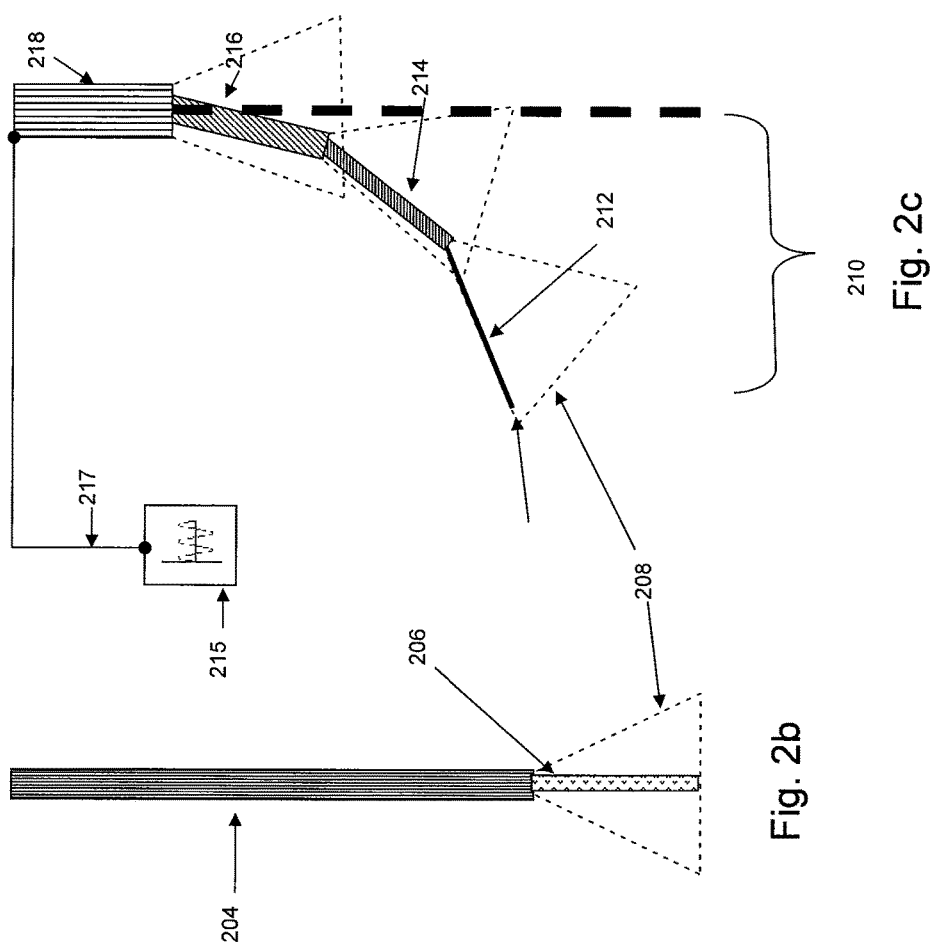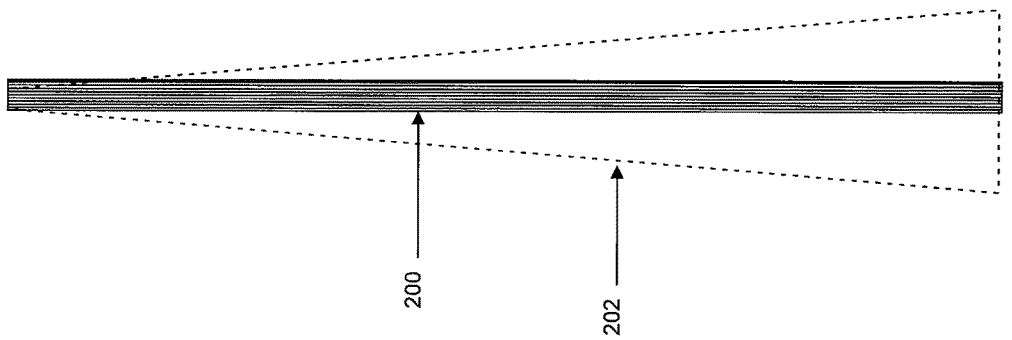

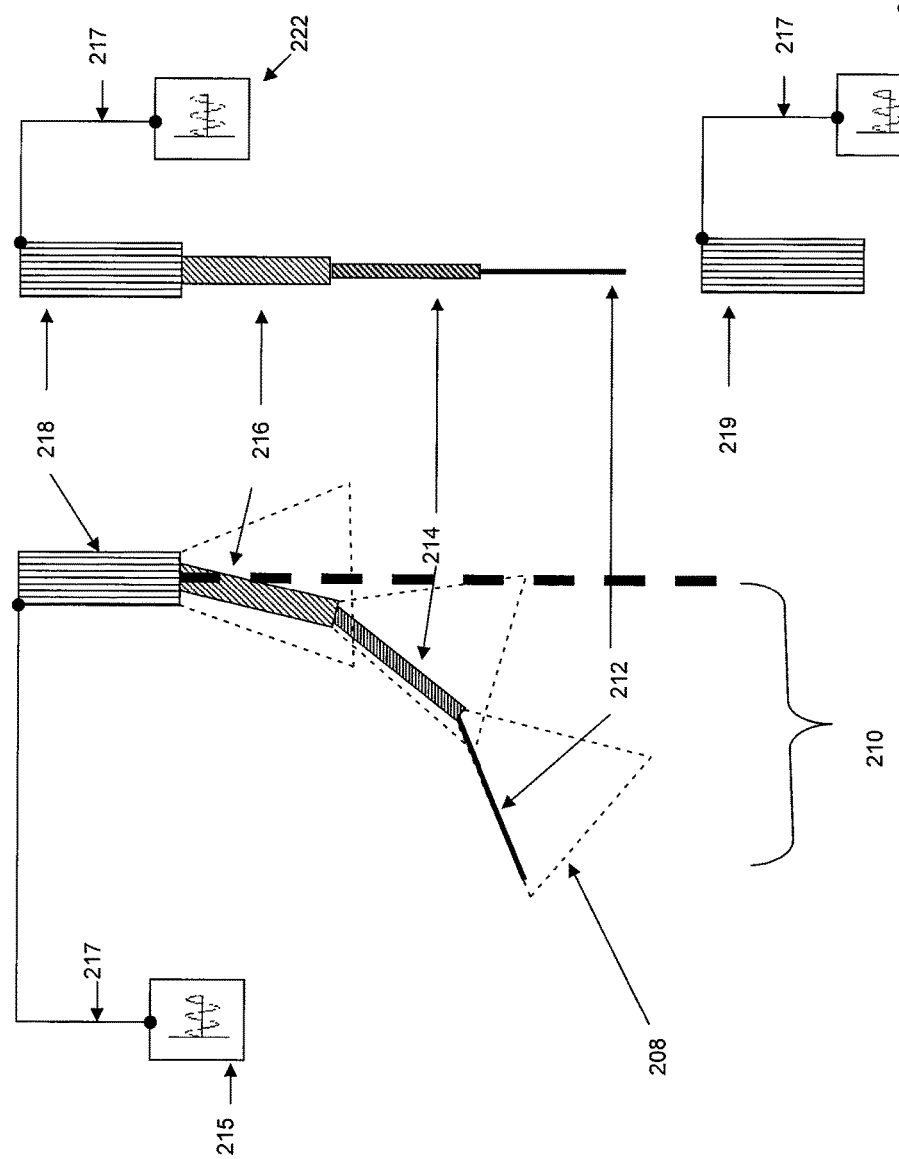

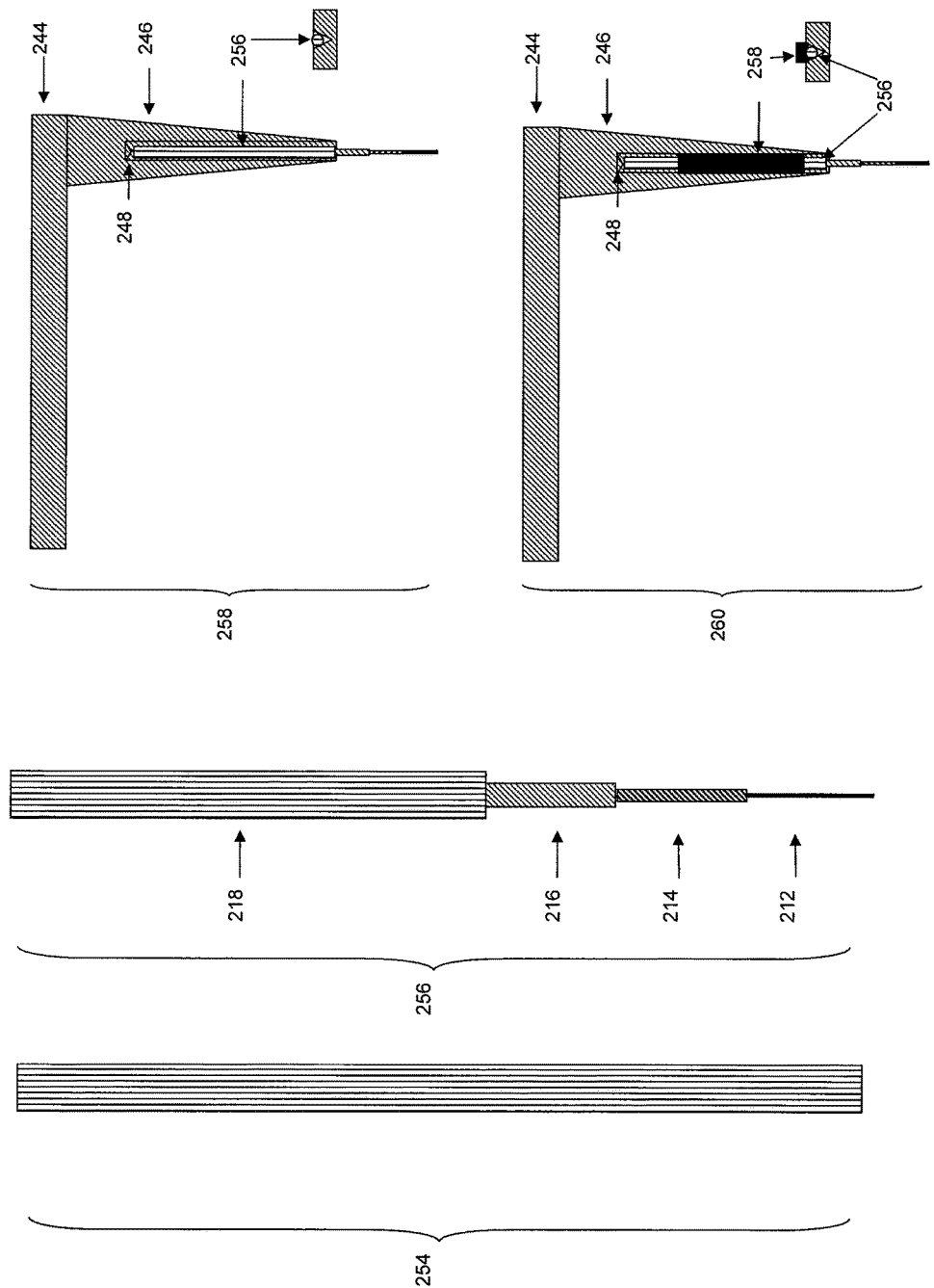

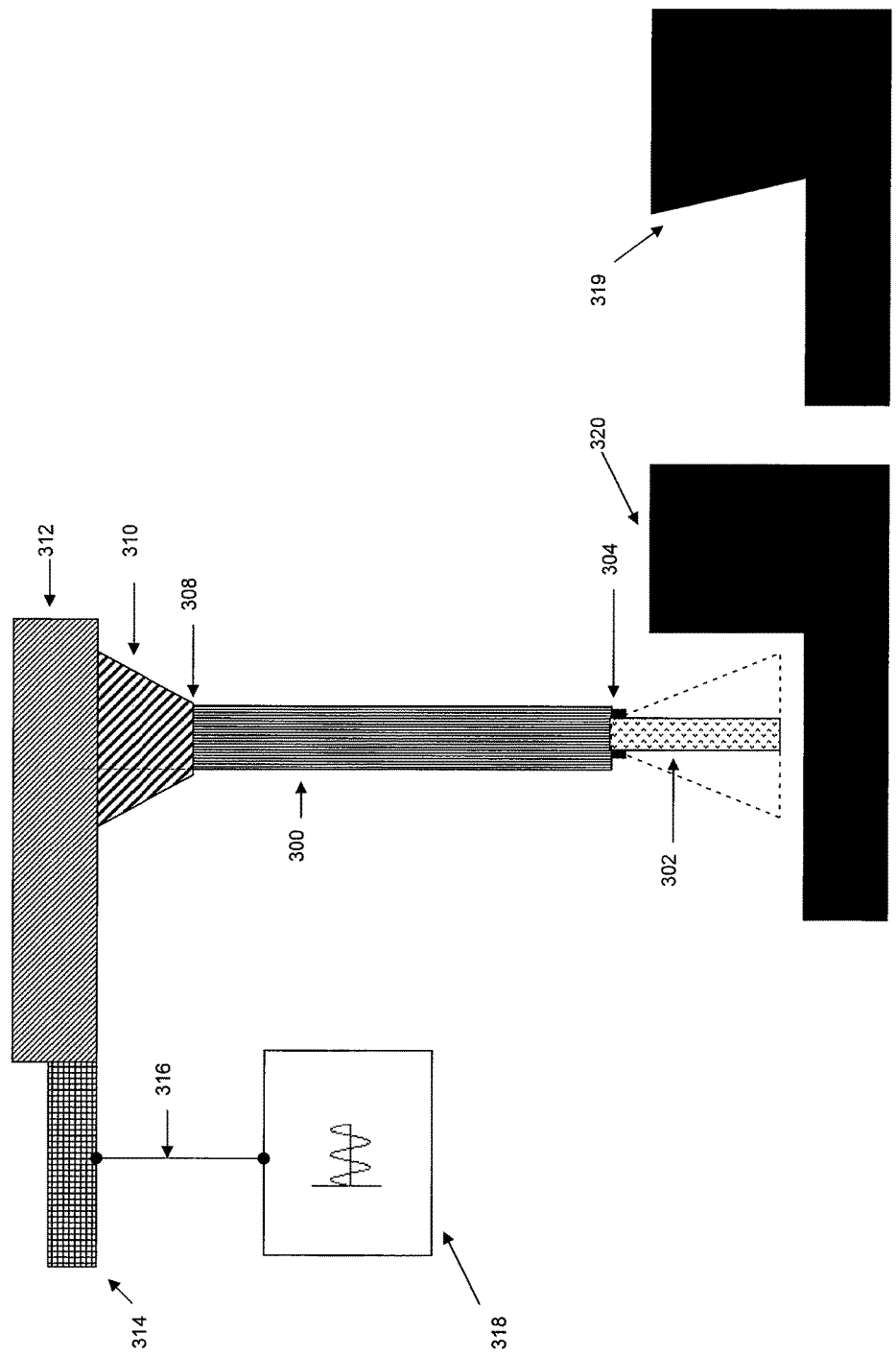

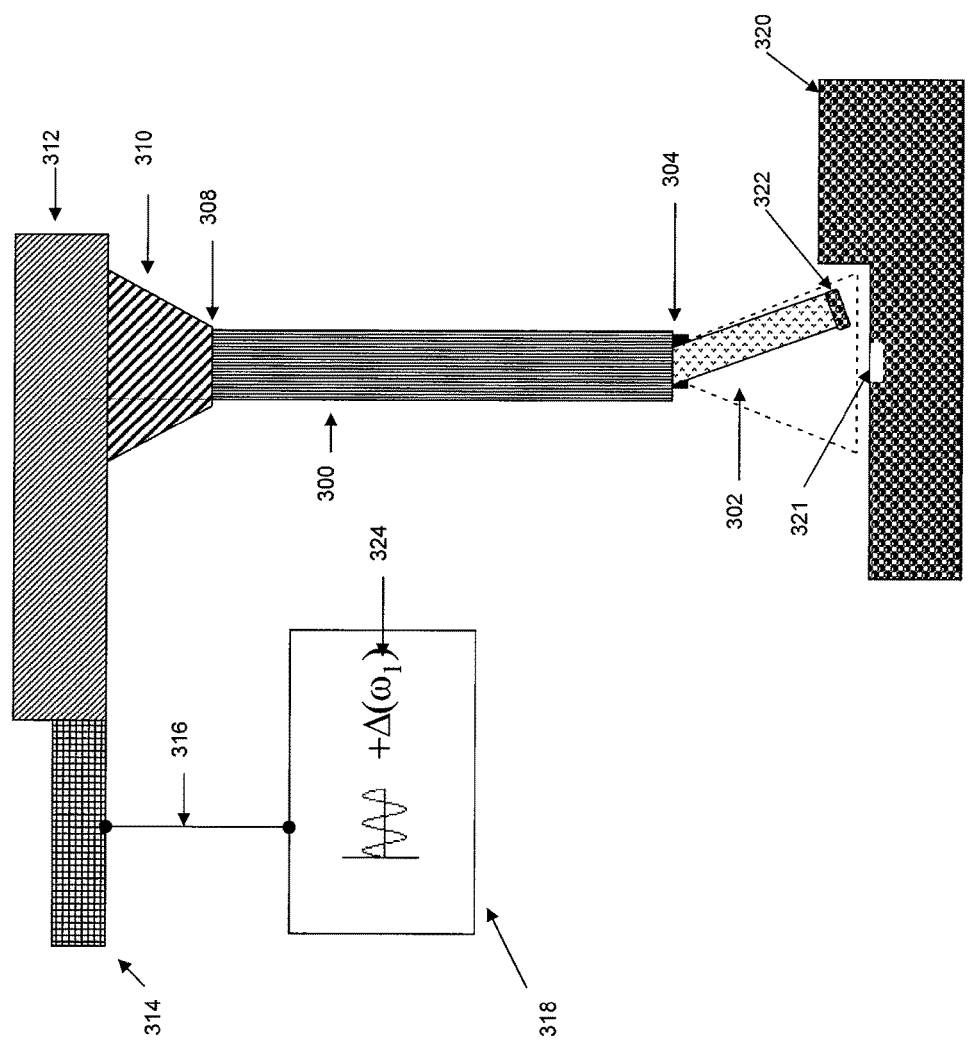

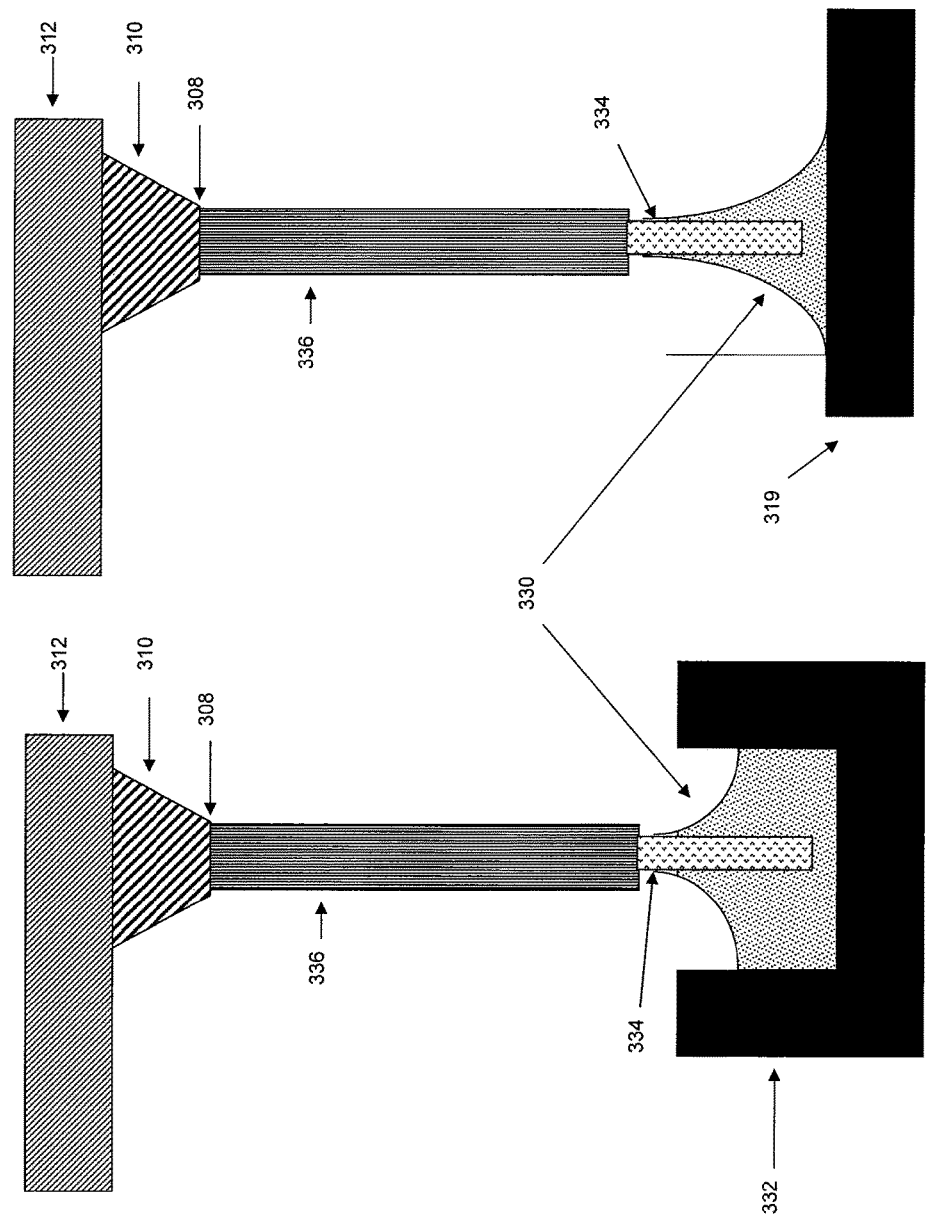

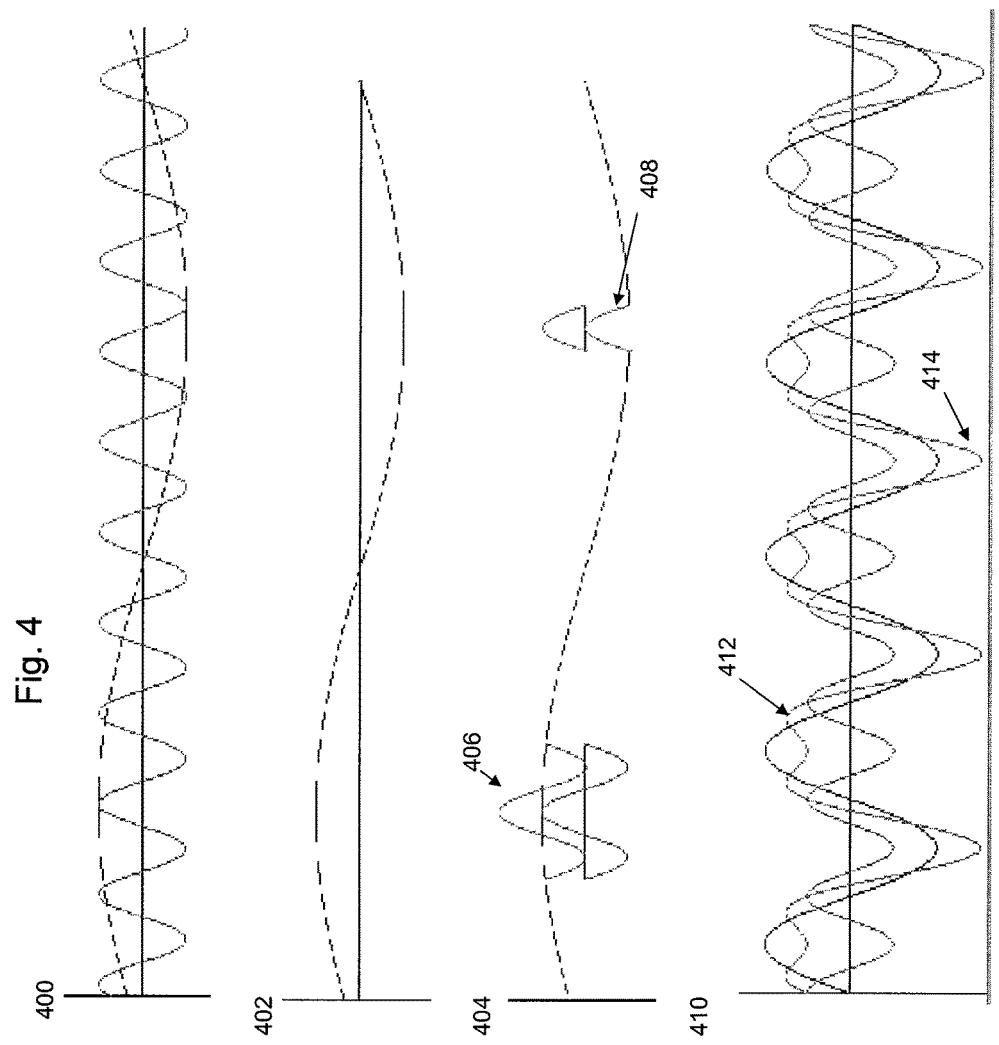

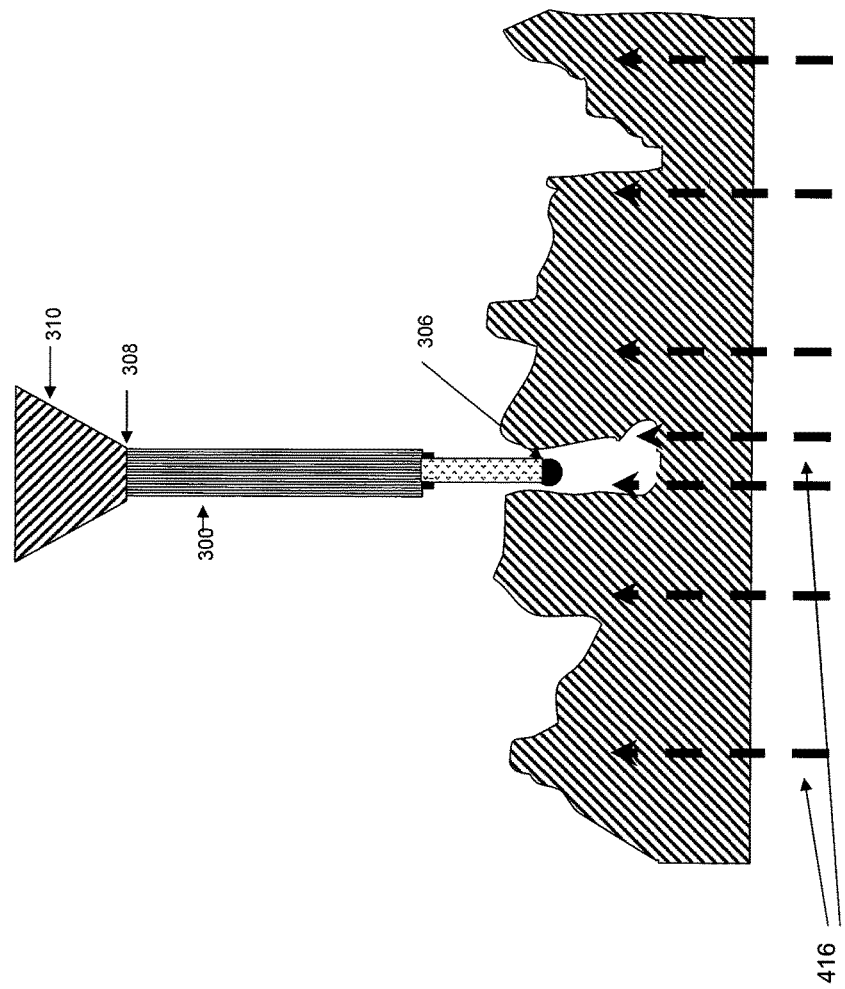

CARBON NANOTUBE PROBES AND STRUCTURES AND METHODS OF MEASUREMENT

CROSS-REFERENCES TO RELATED APPLICATIONS

This application claims the benefit of U.S. Provisional Application No. 60/898,495, filed Jan. 30, 2007, entitled "Attoscopic Systems," and of U.S. Provisional Application No. 60/938,616, filed May 17, 2007, entitled "Carbon Nanotube Probes and Structures and Methods of Measurement." The respective disclosures of these applications are incorporated herein by reference for all purposes.

BACKGROUND AND SUMMARY OF THE INVENTION

The present invention relates generally to techniques for measuring, modifying, analyzing, imaging objects and surfaces having reentrant or other structural elements. The invention relates to SPM probes whose characteristic shape and radius may be obtained by dynamic motion of the tip end.

The present invention uses variant forms of scanning probe microscopy and employing nanotubes and particularly carbon nanotubes which may be catalyzed and grown by Chemical Vapor Deposition (CVD) using sites made of iron, molybdenum, cobalt, nickel, ruthenium, zinc and oxides thereof. Further these nanotubes may have materials such as copper, silver, platinum, palladium, gold, indium, niobium and other suitable materials including materials that exhibit non-linear optical behavior such as second, third and n harmonic EMF emissions and/or fluorescence deposited internally and/or at the probe tip and may be welded or joined together to make assembled coaxial nanotube structures with varying diameters. In nanotubes the attogram quantities of materials require much lower melting points than in bulk e.g. copper goes to under 800° C. and silver with a bulk melting point of 961.93° C. melts at less than 700° C. both temperatures being compatible with carbon nanotubes.

In present techniques for SPM sidewall profiling, measurement or modification probe tips are used which limit the size of reentrant recesses to 60 nm or greater. Further the necessary large end diameter of present probes for sidewall profiling mean that resolution of common (non-reentrant) surfaces is low in resolution (limited by the probe tip diameter to 10 times or more poorer lateral resolution than that obtained with conventional probe tips) and the extreme delicacy of such probes and their cost limit the speed of common surface scans well below those of conventional sharp probes. Semiconductor processes and other applications in material and biological applications demand sidewall ability for recesses sized below 60 nm with very large depth to width ratios. None of the present techniques offer the ability to measure double reentrant structures. Further such present tips are easily broken and suffer rapid wear in recesses which approach their working diameters. Breakage and aging in any tip used is something very desirable to monitor in situ which is difficult or impossible for present systems. It has also always been desirable to detect the materials being scanned and to be able to transport to or from target sites volumes of material to partially remove and/or partially deposit thereon.

Present techniques for scanning and scanning probe microscopes (SPM) using nanotube tip ends also are limited in general by the flexibility of nanotubes and their common tendency to adhere (stick) to surfaces due to Van Der Waals attraction which in particular causes artifacts in the detection system of the SPM and especially on surfaces having modest to extreme slopes. The latter effect has limited the application of such nanotubes despite their otherwise excellent properties of strength, hardness, minimum wall angle over very large length to diameter ratios and small end diameters of 2 nanometers or less. Finally the variability, alignment and mounting problems of conventional AFM, TUNA and similar cantilever enabled SPMs are a major obstacle to a broad adoption of multi-mode SPM measurement on the factory floor.

It is an object of this invention to provide a means by which reentrant recesses as small as or smaller than 50 nm may be imaged, modified and measured. Another object is to use obdurate nanotubes as the principal tip material to provide diamond like wear characteristics. It is a further purpose of this invention to show a means whereby doubly reentrant structures may be imaged, modified and measured. It is yet another object of this invention to provide a means whereby photons may be collected or delivered by the probe tip for measurement, modification or material transformation, addition or subtraction of the target surface or volume. Further it is the purpose of this invention to provide for sections of nanotube of similar or different diameters welded to create a probe with multiple resonant and structural characteristics. It is yet another purpose of this invention to provide a means of phase and amplitude differential actuation of reentrant tips such that complex non-symmetrical resonance of the probe (nanotube) tip may be obtained. Another purpose is to provide for reentrant measurement using electron methods such as STM, TUNA and other related methods. A further purpose is to provide a means for calibrating such measurements. Yet another purpose is to provide a means for adding or removing material from surfaces, and interior volumes and measuring the mass of such material. Also using the latter mass to determine the density and identify the material or its constituents. Further it is desirable to provide a method to effectively use nanotubes with varying stiffness and end radius. It is another purpose of this invention to overcome general use problems with nanotubes in which the local Van Der Waals force causes the nanotubes to adhere to the probed surface and interfere with the SPM surface data collection. It is a further purpose of this invention to provide various methods for measuring the surface or volume interaction of nanotubes due to the change induced in their resonance in one or more axis of motion, said resonance due to mechanical, electric, or electromagnetic means. It is also a purpose of this invention to provide a SPM surface approach and/or surface measure using nanotubes and a means to drive resonant or non-resonant motion in said nanotubes due to electric, or electromagnetic fields in conjunction with other common methods or as the principal means of such approach or measurement. In conjunction with the latter means it is also a purpose of this invention to provide a means for determining and monitoring the resonant frequency of a nanotube structure by use of a reflected signal.

The following detailed description together with the accompanying drawings will provide a better understanding of the nature and advantages of the present invention.

BRIEF DESCRIPTION OF THE DRAWINGS

FIG. A shows an operating principle of the present invention.

FIG. 1 shows AFM, tip and cantilever assembly 100 with attached nanotube 102 in a recess of specimen 106. Nanotube 102 is resonating in a motion bounded by the dotted lines 104.

FIG. 2a shows the simple single nanotube sub-assembly 200 with associated locus of fundamental resonant mode of vibration 202. Nanotube 200 is affixed to the base AFM and equivalent to nanotube 102 of FIG. 1.

FIG. 2b shows nanotube sub-assembly 204 (again equivalent to 102 of FIG. 1 and affixed to the AFM), with a secondary lower fundamental frequency nanotube 206. affixed at the end of 204.

FIG. 2c shows nanotube 218 (again as above affixed to the AFM and equivalent to 102 of FIG. 1) as with multiple nanotube elements (of similar length but decreasing diameter and lower fundamental frequency) 216, 214, and 212.

FIG. 2d-2e shows nanotube assembly 2c as above affixed to the AFM and equivalent to 102 of FIG. 1) as with multiple nanotube elements (of similar length but decreasing diameter and lower fundamental frequency) 216, 214, and 212 with the additional elements 215 and 217.

FIG. 2l is another side view of an electron beam structure showing the process component of an SOI wafer 296 with oxide 294, diamond layer 285 and device layer 278.

FIG. 3a shows the principal elements of FIG. 3 with two reference structures 319 and 320.

FIG. 3b also shows the elements of FIG. 3 along with material 322 pick upped by interaction of the probe tip end 302 with specimen 320 removing material 322 from 320 to leave vacancy 321. The resonance frequency and source 318 driving the final tip end 302 is then offset by some frequency 324 due to the change in mass of 302.

FIG. 3e shows a segmented nanotube structure 334 and 336 in which the segment 334 has been treated such that its fluid characteristics (to reject or attract any given fluid type e.g. aqueous or oil) are opposite those of the segment 336 from well 332.

FIG. 4 shows four examples of sinusoidal drive waveforms 400,402,404, 410 and the sinusoidal components of each along with the resultant final waveform corresponding to the effective range of motion of the final tip end 302 and the effect of phase differences on the resultants 406,408, 412, 414.

FIG. 4a depicts a complete tip shaft assembly 310, and 300 which includes a negative index of refraction optical (plasmonic) silver coupling 306 into the nanotube which is then coupled by 300 to a photodetector located on 310 and able to sense photons or plasmons transiting the nanotube/primary tip at the boundary 308. Further the specimen is illuminated from below by electromagnetic radiation 410.

Figure 1A:
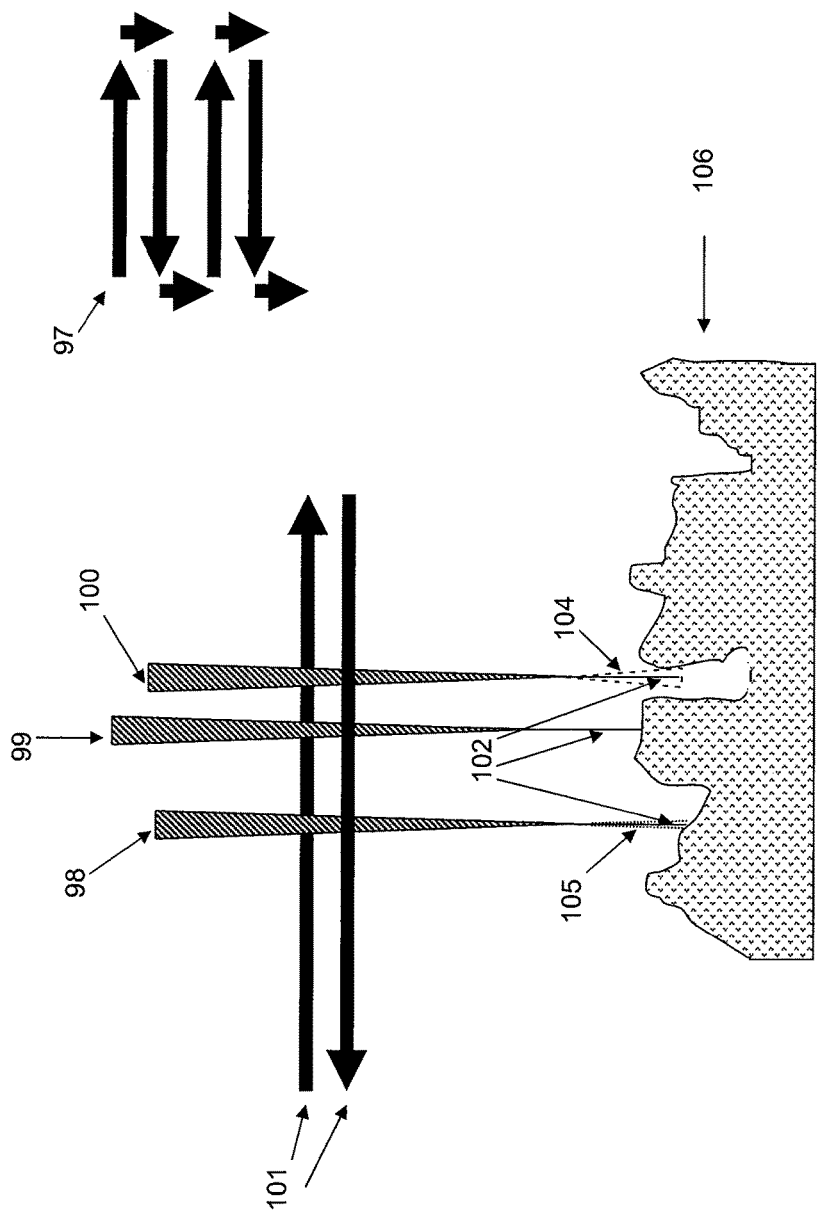
FIGS. 1a-1C illustrate scanning motions according to embodiments of the present invention.

Materials within the nanotube matrix in process or in situ as attached to or grown onto an appropriate SPM such as metals drawn to the ends of the nanotube increase electrical coupling and photon coupling to structural detectors or emitters. Further such material can be used to adjust the resonant frequency of the nanotube oscillators used in sidewall sensing.

DESCRIPTION OF SPECIFIC EMBODIMENTS

As shown in FIG. A, sidewall profiling uses a nanotube structure to probe a recess or hole. After entry into the hole and displacement toward a side to be measured the nanotube is then resonated at a sequence of z levels. At each z level the amplitude of resonation of the nanotube is increased until the sidewall is detected by well known SPM techniques (AFM, STM, TUNA, etc.). This value then is used to build up a true surface measure of the sidewall. Enlarged at right is a variation using a multi-stage nanotube such that the angle of resonance of the smaller diameter stage can be maximized to resolve deep sidewall structures.

In one preferred embodiment of the invention as in FIG. 1 an Atomic Force Microscope cantilever and tip assembly 100 includes a carbon nanotube 102 (single wall or multi-wall) attached to the tip of the cantilever tip assembly and comprising the final scanning tip structure (the portion of the tip actually near or in contact with the target specimen 106). A resonating means FIG. 3, 318 drives a piezoelectric actuator 314 through electrical connection 316 to create a resonant motion 104 at the nanotube 102. This motion where the nanotube is free to vibrate in vacuum or a fluid medium is described by the equations for the motion of a symmetrical rigid rod which follows.

Figure 8:
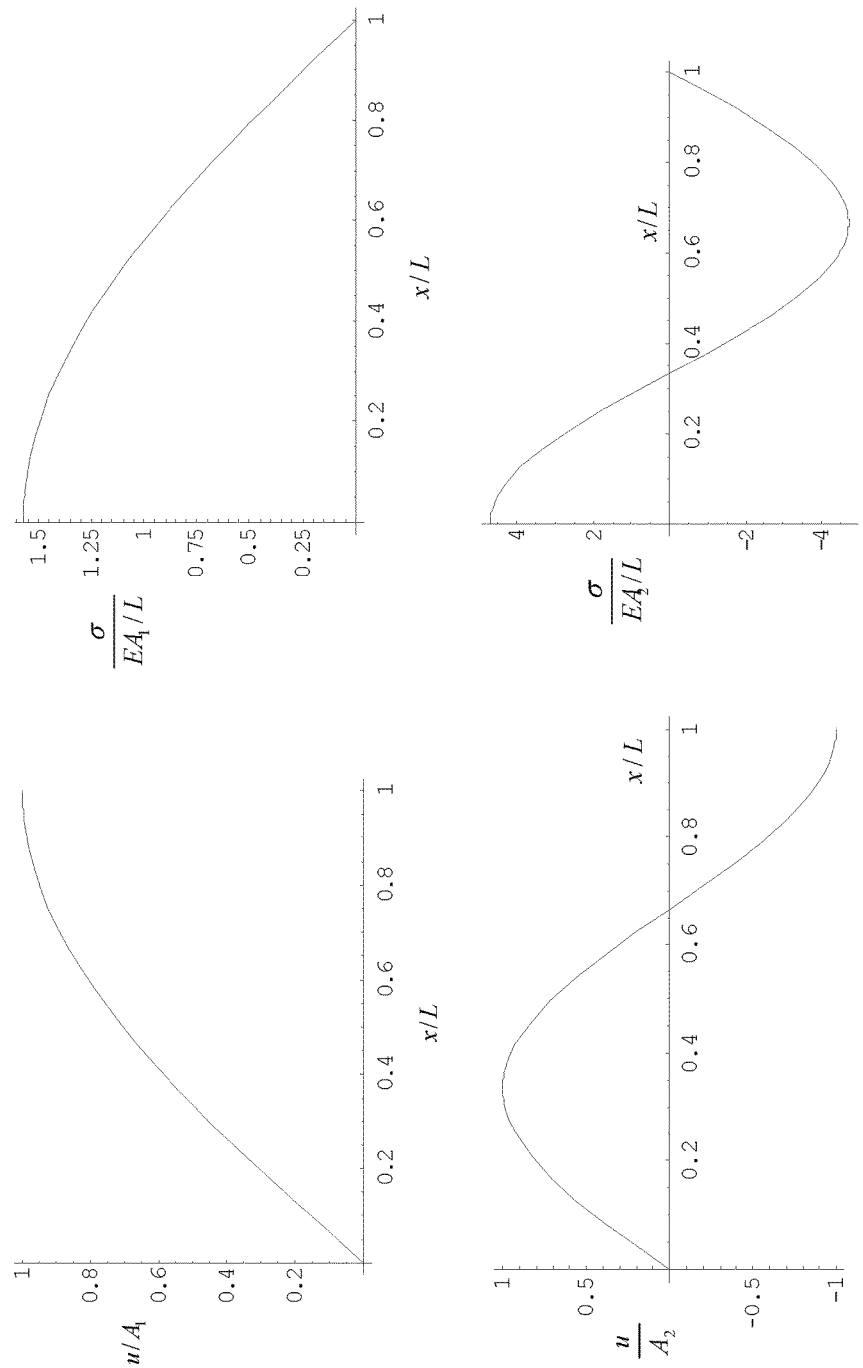
FIG. 8 shows graphs of the normal-mode motion functions u and c (scaled as indicated in the axis labels) as a function of x/L for the first two modes of a nanotube rod as shown in FIG. 1.

The basic nanotube rod of FIG. 1 and subsequent figures has many normal modes with maximum amplitude under motion induced by the $1^{st}$ mode at the primary resonant frequency $\omega_1$:

$$\omega_1 = \frac{\pi}{2L}\left(\frac{E}{\rho}\right)^{1/2}, \quad u(x,t) = A_1 \sin\left(\frac{\pi x}{2L}\right)\sin\omega_1 t, \quad 1^{st} \text{ mode}$$

$$\sigma(x,t) = A_1 E \frac{\pi}{2L} \cos\left(\frac{\pi x}{2L}\right)\sin\omega_1 t$$

$$\omega_2 = \frac{3\pi}{2L}\left(\frac{E}{\rho}\right)^{1/2}, \quad u(x,t) = A_2 \sin\left(\frac{3\pi x}{2L}\right)\sin\omega_2 t, \quad 2^{nd} \text{ mode}$$

$$\sigma(x,t) = A_2 E \frac{3\pi}{2L} \cos\left(\frac{3\pi x}{2L}\right)\sin\omega_2 t$$

and so on. When excited, the motion of the rod is a superposition of all the normal modes. FIG. 8 shows graphs of the normal-mode motion functions u and σ (scaled as indicated in the axis labels) as a function of for the first two modes. The first mode is known as the fundamental mode. It has the lowest frequency.

In operation the AFM assembly 100 is first calibrated and its fundamental mode frequency is determined by its interaction as detected by short distance Van Der Waals interaction with a reference vertical or reentrant surface such as FIGS. 3a 319 and 320. AFM 100 is used to scan a surface without fundamental frequency sinusoidal acoustic drive to the nanotube FIG. 1, 102 at high speed and limited only by the resolution diameter and at rest shape of the tip end. If one or more regions having vertical walls are found then sidewall scanning is appropriate. To characterize these regions as either vertical or reentrant along the z direction. 102 is then resonated at a series of z heights adjacent to the wall to be measured. At each z height a series of measures are taken at ever increasing amplitudes of the fundamental mode frequency until the wall at that z height is detected by the AFM assembly 100. Each time nanotube is resonated the locus of the nanotube resonance 104 at a given amplitude serves as a dynamic probe shape. The amplitude at the given z height is used to calculate an offset to the three space position of the nanotube tip when the acoustic drive is off (normal AFM mode) thus creating a measured x,y point along the z axis of the wall where the locus of motion of the vibrating nanotube is at a minimum or near minimum distance to the wall.

It should be noted that although nanotubes and especially carbon nanotubes are the preferred material for the end tip resonant construction any other material including silicon, diamond (sp3), graphite (sp2), carbon, gold, silver, tungsten, hydrocarbons, organic molecules, boron nitride, boron carbide, silicon oxide, silicon carbide, and silicon nitride or any combination of these materials including nanotube forms can be used to facilitate reentrant profiling.

In FIG. 1a the preferred scan embodiment (process detailed in FIG. 5 and the FIG. 5 description) is one in which the object 106 is scanned by a continuous motion 101 of the tip at different positions 98,99,100 with nanotube 102 and representative resonant amplitudes 105 and 104 in a bostrophodonic pattern 97 alternating strokes without reversing direction within any given stroke.

Figure 1B:
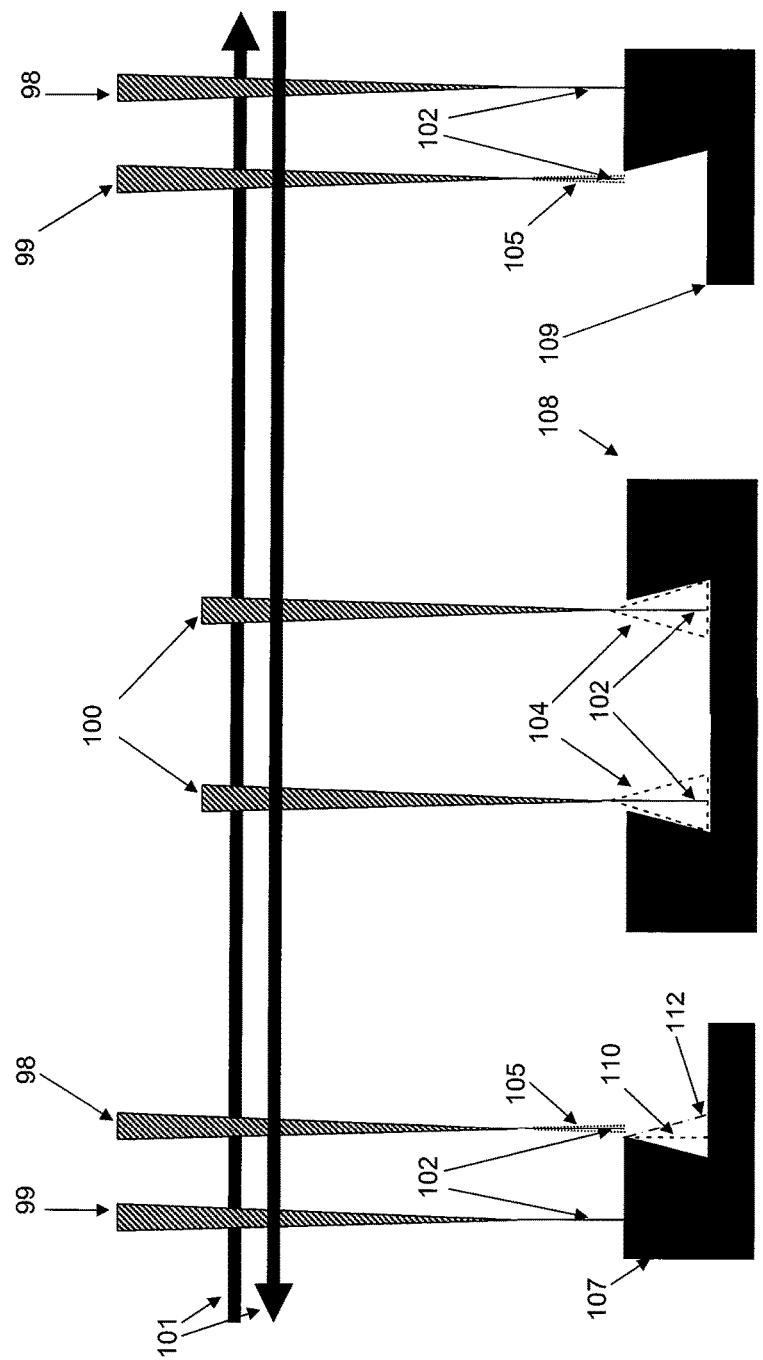

In FIG. 1b the same technique as above is shown on three separate typical semiconductor features 107, 108, and 109 and shows the changes in the resonant amplitudes 104, 105 and 112 as a function of the slope of the surface and the height of the object surface. Various slope related algorithms can be employed.

Figure 1C:
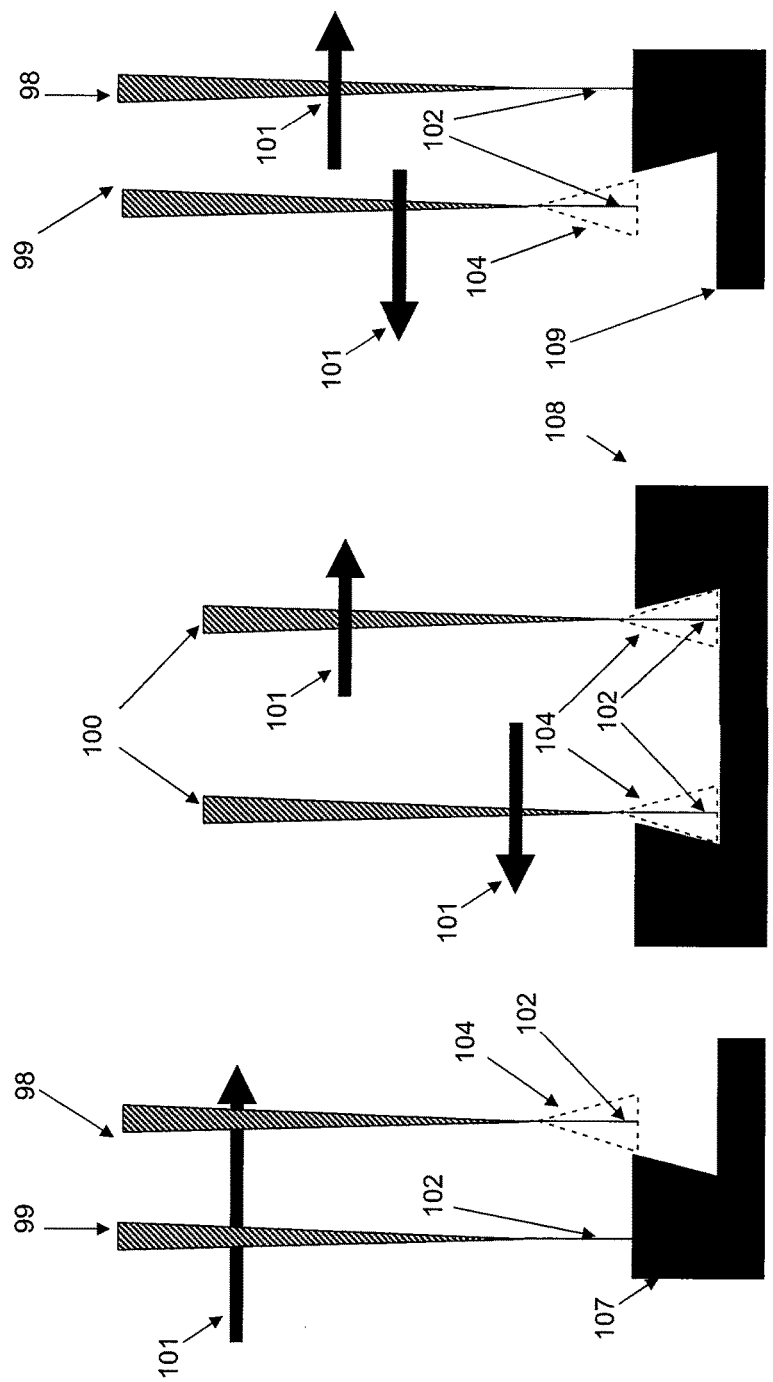

FIG. 1c shows the motion associated with a scan technique in which the scan lateral motion 101 is locally reversed within the total scan in any direction and the resonant amplitude 104 is set to one or more fixed calibrated values.

Dynamic or active tip end effectors can also be made from molecules that can change shape under acoustic, chemical, electrical, thermal, electromagnetic, or magnetic control. Like nanotubes such tip ends can probe reentrant and multiply reentrant structures.

Figure 2F:
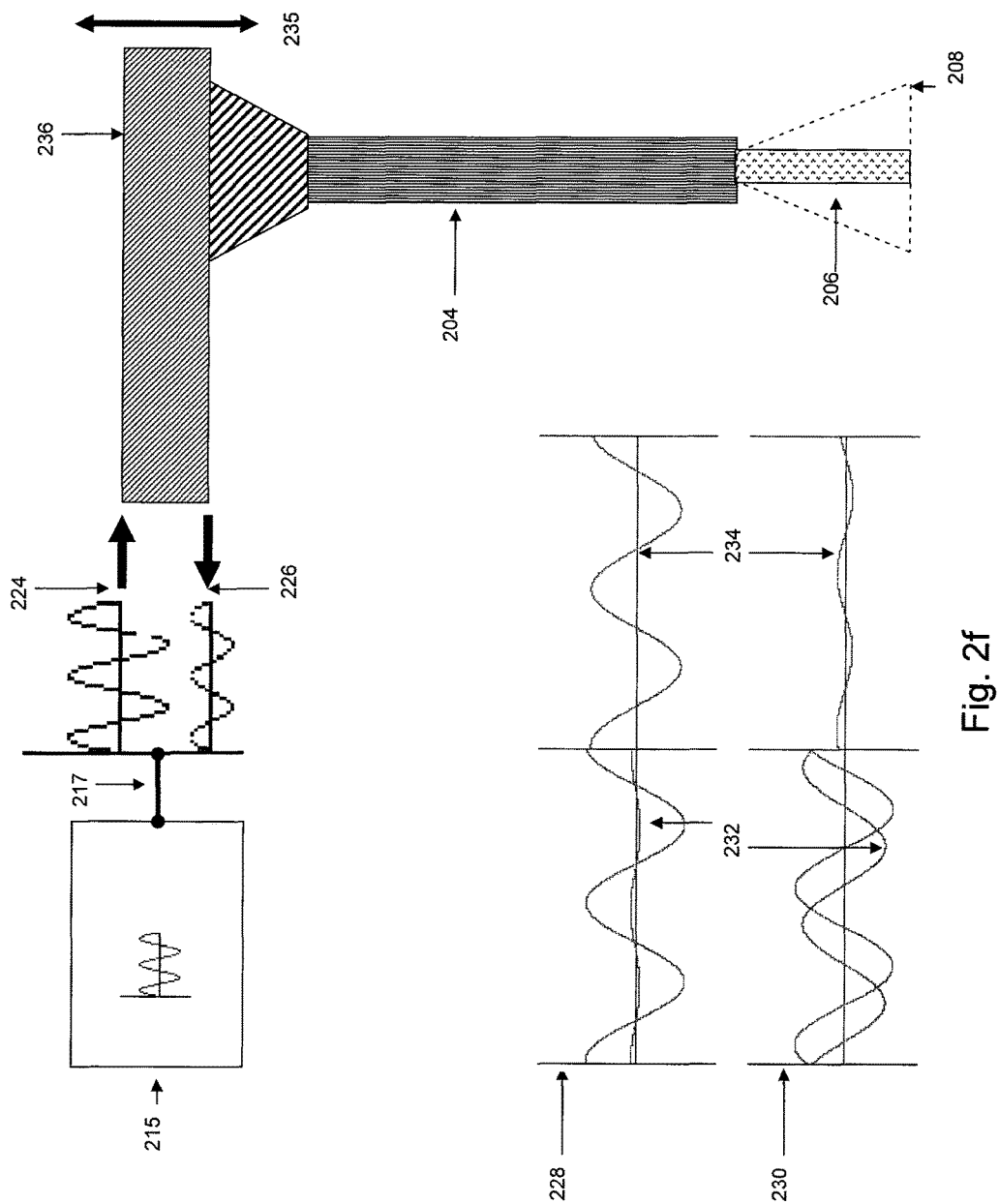
FIG. 2f details the embodiment with an electromagnetic drive 215,224 and reflected energy 226 resonance sensing 215. 236 is the cantilever tip assembly with tip end nanotube 206 and larger diameter support nanotube 204. A typical drive wave train 228 whose wavelength is near resonance of 206 has a small reflective wave 232 with most of the drive wave as the transmitted wave 234 passing into the tip structure 206. Drive train 230 shows a large reflected wave 232 with a small transmitted wave 234.

Further, use can be made with dual FIG. 2b or multiple FIG. 2c nanotubes or other structures to provide complex motion in conjunction with differential phase control of each respective nanotube section's fundamental frequency. FIG. 4 details the wave trains 404, 410 used to control a given resonant portion of the tip 2c by the phase relationship between resonant sections. In such use one component of one resonant section may added 406, 414 or subtracted 408, 412 in varying amounts from another section. FIG. 2c reflects the use of a four stage nanotube assembly which may be welded or otherwise joined construction and suitable for common AFM use or a multiwall nanotube which self extends under the influence of an electric field on the tube and then retracts when the field is removed. A self-extending nanotube tip end is extremely stiff when retracted FIG. 2f, 218 under the influence of near zero voltage 220 and can be used (retracted) in an AFM mode or when extended and electrically charged 218 under influence of charge 222 as a tip end for STM or TUNA, SPM operation. In an additional embodiment in order to drive the nanotube assembly with motion from side to side with respect to the central axis of the nanotube assembly as shown in 2e one or more drive frequencies can establish a resonance with any of 218, 216, 214, 212. In an alternate embodiment the length of each segment of the multi-walled nanotube 212-218 can be chosen such that each length has a resonant frequency independent of any other or the harmonics of any other so that the motion induced in each segment can be kept independent. Further in the latter embodiment the independently resonant nanotube with two or more segments can be used to create a tuning device to discriminate (tune) multiple frequencies from any source of electric or electromagnetic energy. Further in the latter tuning device a fixed or variable field along the sliding axis of the multi-walled nanotube as in 2g and 2h herein can be used to further vary and tune the device. In fact by choosing a time varying changing field along the sliding axis a unique and undetectable spread spectrum function can be obtained to provide two or more receivers/transmitters locked to each other (by having the same nanotube mechanical properties and segment lengths) but undetectable by any other interloper. In all embodiments side to side motion may be induced by use of the phase control between the different segments with different fundamental frequencies of a multistage nanotube structure the motion may be biased in a preferred direction to steer the tip end as desired, use may also be made of the polarization of any electromagnetic wave used to induce resonance. The steering motion may also be fully controlled in acoustic drives by use of more than one actuation piezoelectric drive FIGS. 3 314, 316, 318 and 326, 328 orthogonal to each other to excite orthogonal, circular or elliptical motions in the tip end with differential phase drives in both PZT actuators. Furthermore the various excitation modes and methods may be combined so that for instance an oscillating multiwall nanotube 2f driven by the relatively slow sine voltage in phase with the motion of the cantilever 236 in TUNA (Tunneling AFM) may be combined with a Piezo 314, 326 and/or LASER 328, 330, 332 driven side to side oscillation means to produce a dynamic probe that makes a side to side oscillation only when the nanotube 2f is extended near the bottom of the cantilever stroke, this method may in fact provide an embodiment which insures the quality and signal strength of the tunneling and/or AFM action.

Figure 2G:
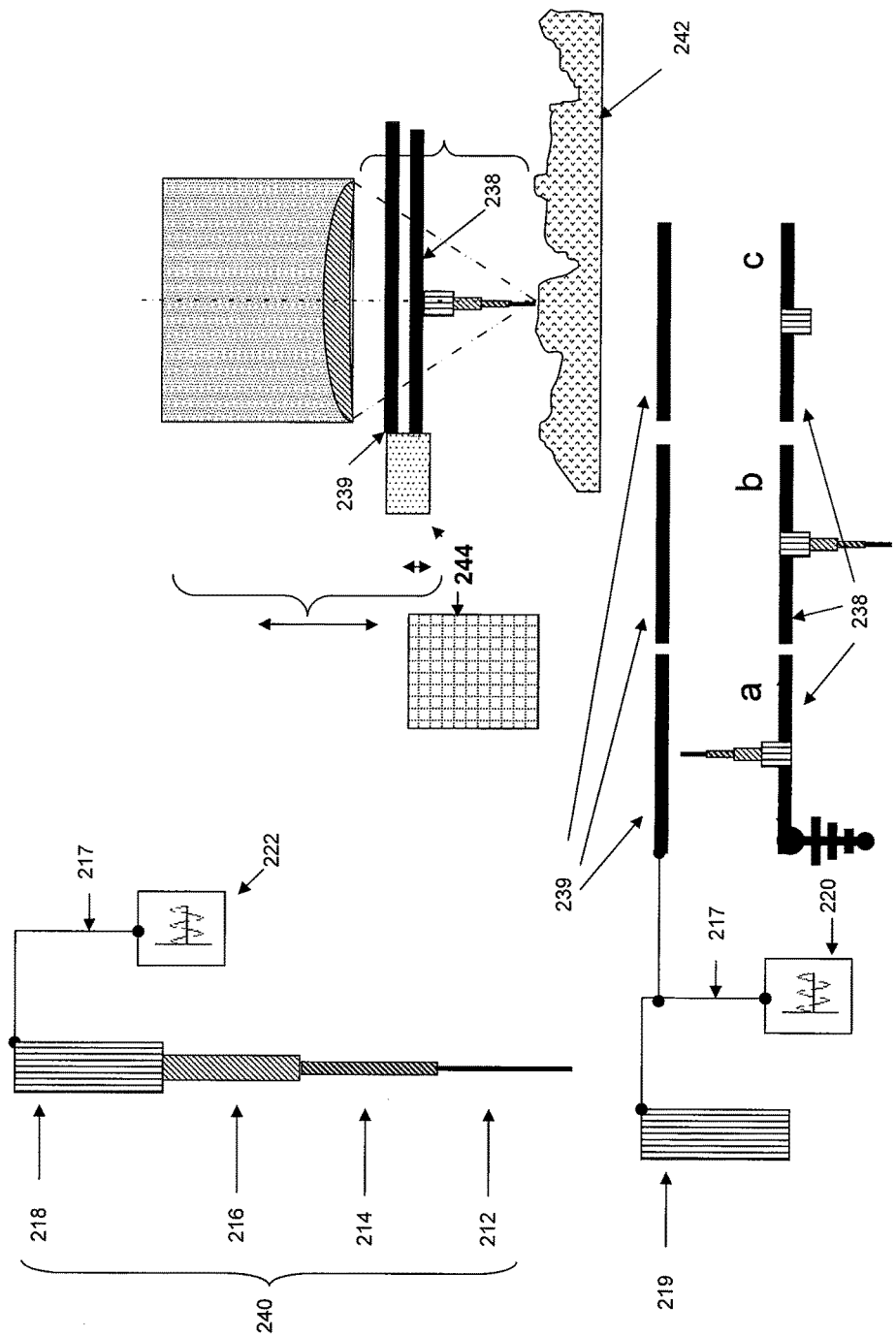
FIG. 2g shows a freely extendable version of nanotube assembly 2c as above affixed to the AFM and equivalent to 102 of FIG. 1) as with multiple nanotube elements (of similar length but decreasing diameter and lower fundamental frequency) 216, 214, and 212 with the additional elements 215 and 217 in which the telescoping nanotube 218 is extended (upper FIG. 2g) and withdrawn (lower 2g) with the change in amplitude of the driving voltage higher than the minimum voltage for extension 220 and withdrawn at voltage zero or near zero 222.
Figure 2H:
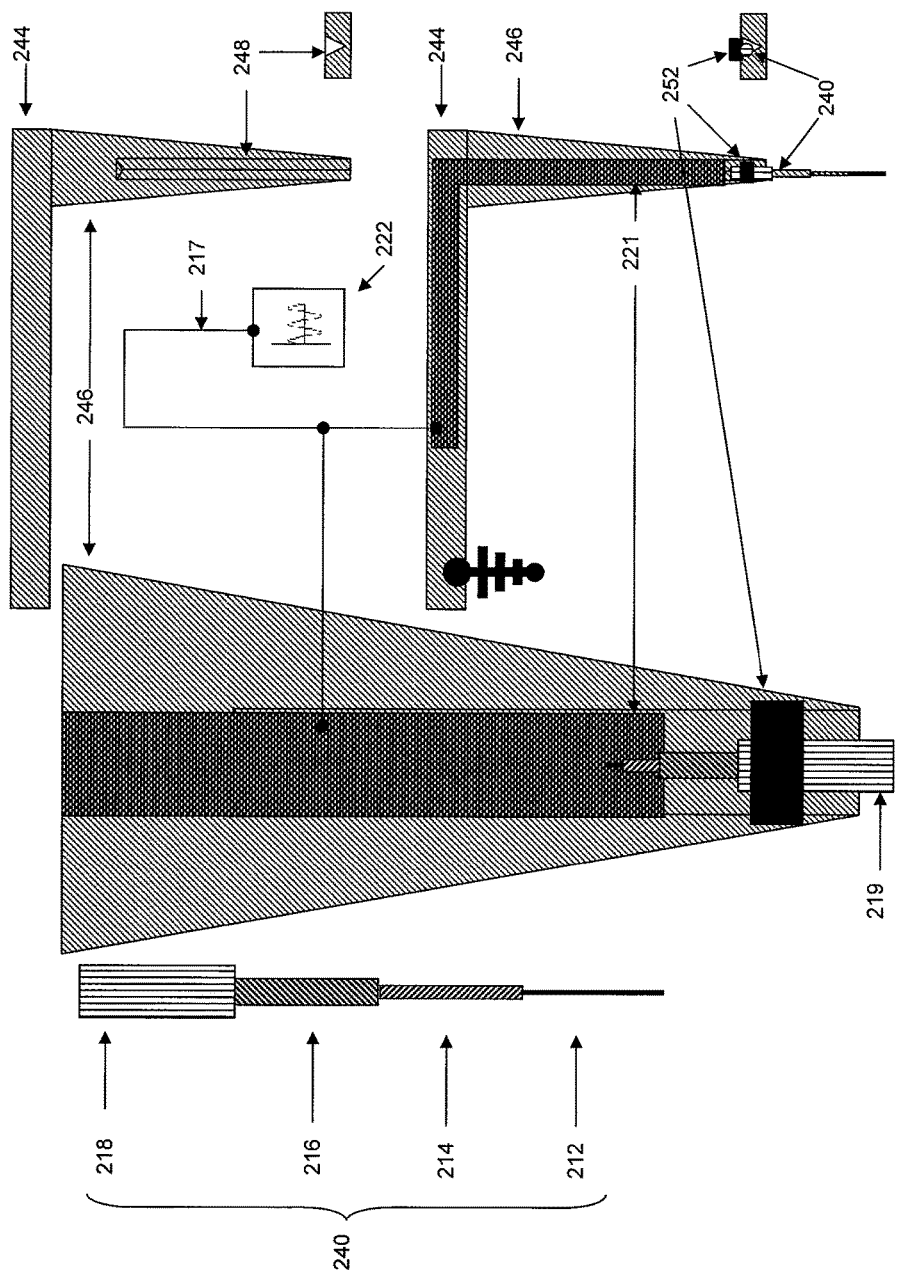
FIG. 2h shows an embodiment of a stepped multi wall nanotube 240 which is a grounded multi-wall nanotube that has been trimmed to different length concentric tubes free to slide into and out of 218 the largest diameter nanotube under the influence of voltage 222 applied to electrode 221. 240 is bonded on the outer nanotube by bonding strap 252 to the main probe tip shaft and body.
Figure 2J:
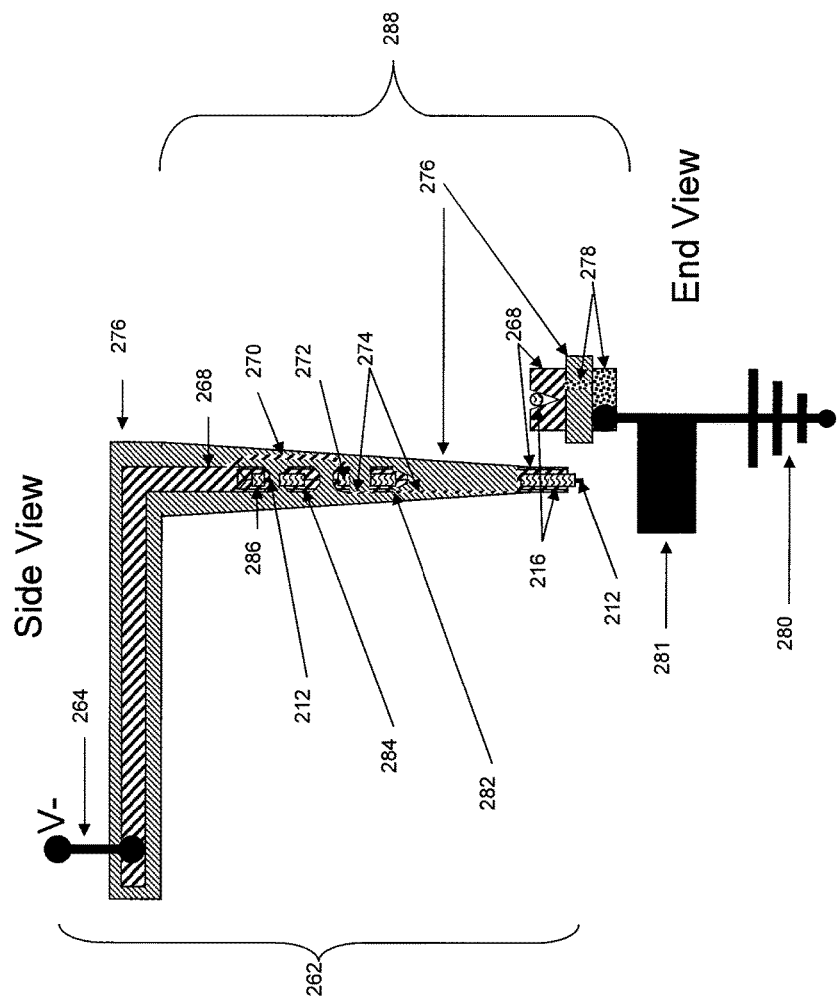
FIG. 2j is a cantilever and tip shaft 262 structured electron beam and secondary collector based on a column 288 of voltage supply 264 electron source 286, focus 284, accelerator 284 & 282, secondary collector 268 and beam aperture nanotube 212 (a nanotube in which the innermost tube has been removed to make a precision sub-nanometer beam aperture). When collecting electron secondaries the collector electronics module 281 is in series with the ground 280.
Figure 2K:
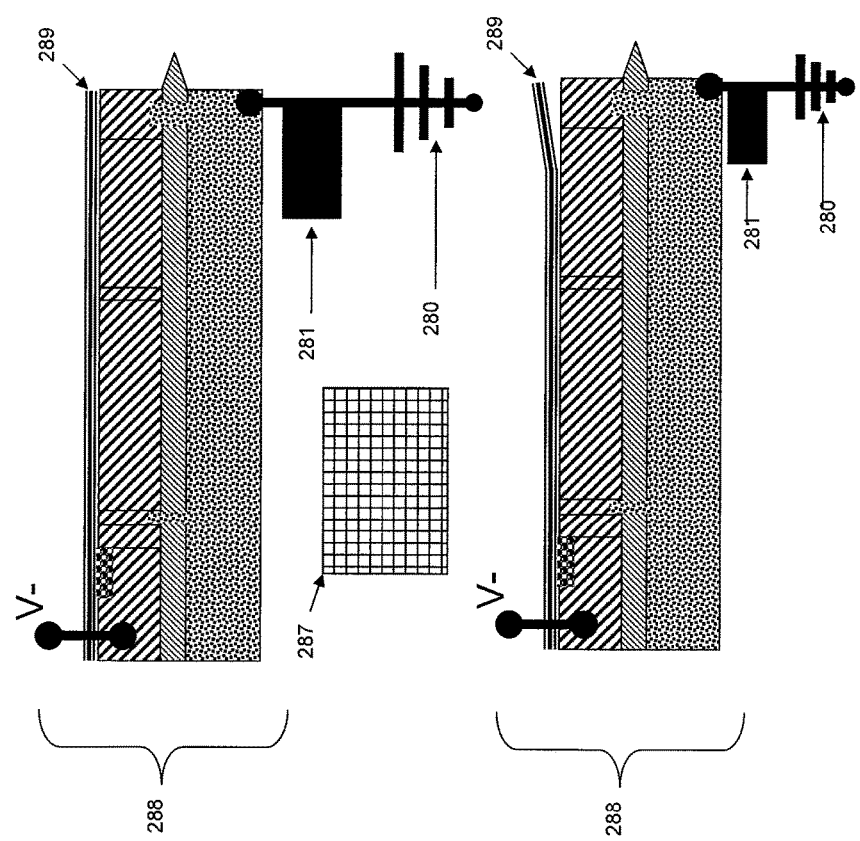
FIG. 2k is a cross section view 288 of an electron beam source as in 2j above in which a cover structure 289 maintains a vacuum in the beam source structure by a wall which in the absence of air pressure (placed in a vacuum) opens to a local vacuum to restore the vacuum conditions.
Figure 2I:
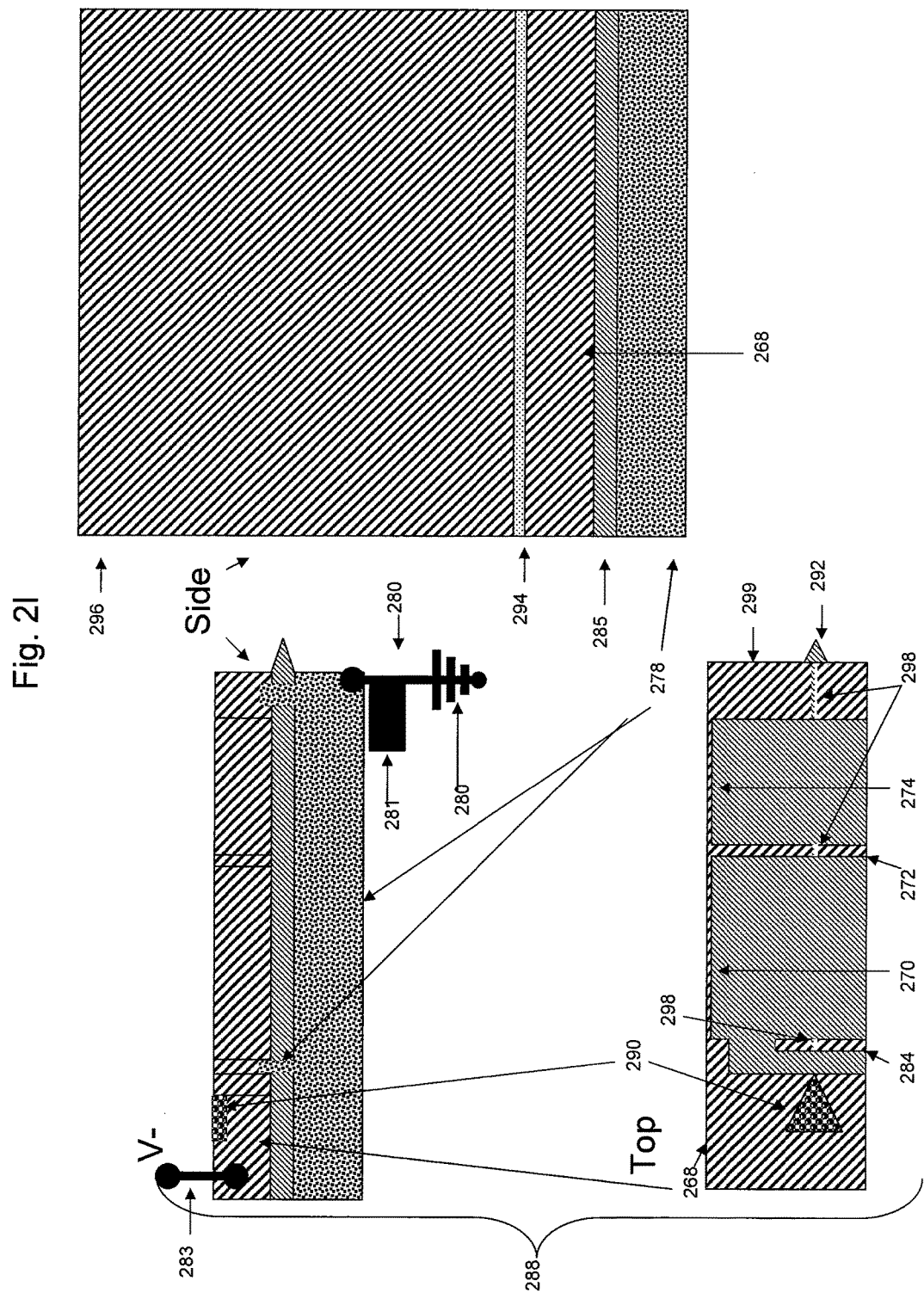
FIG. 2i shows a multi-wall nanotube 254 which has outer walls trimmed by electro beam or application of a selective current to successive nanotube walls.
Figure 2M:
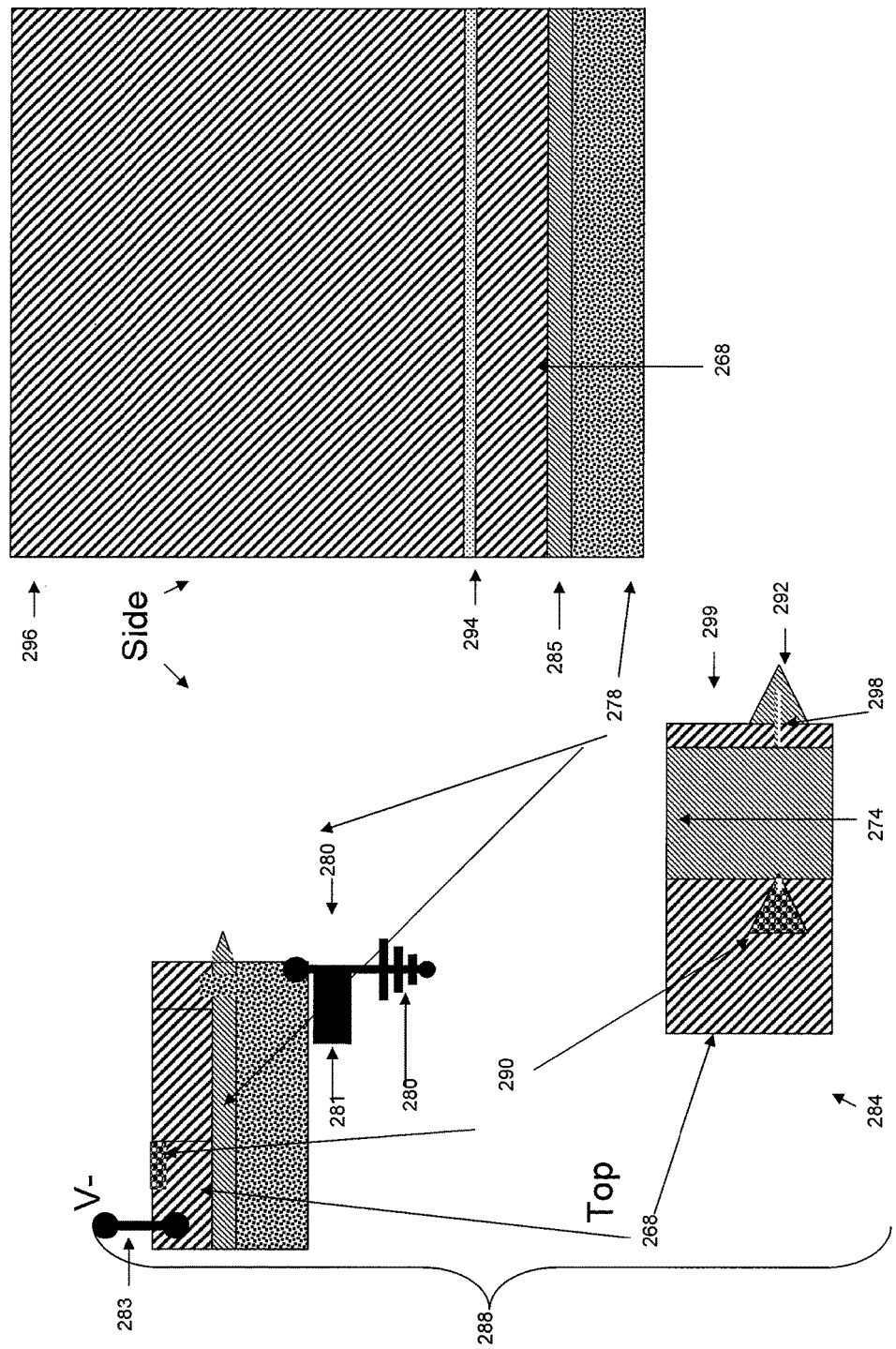
FIG. 2m is similar to 2l except that the electron column is shortened and consists of a source 290, a ground accelerator 299, an aperture 298 and a SPM mode conductive tip 292.

A further embodiment shown in 2f may be used in any of the embodiments shown herein or to improve the use of nanotubes in general AFM, STM, TUNA or other SPM techniques in which Van Der Waals interaction prevents accurate collection of surface information by "sticking" the nanotube intermittently to the structure being scanned. This effect has prevented the general use of single wall nanotubes to obtain the high aspect ratio operation and smallest tip radius due to the Van Der Waals effect. In operation the multiwall nanotube is driven to extend telescopically 2f, 218 and collapse 219 rapidly to disrupt sticking while placing the smallest diameter innermost nanotube in interaction with the surface and in use with vibrating cantilever type SPM i.e., AFM, STM, TUNA etc., then the extension is phase locked with the cantilever vibration to place the extended tip near the surface at some chosen distance depending on the phase but maximal when the overall cantilever vibration is at its closest approach to the surface of the sample is also the farthermost extension of the multiwall nanotube. Phase relationship between the cantilever vibration and the multiwall may have many multiwall extensions in any given portion of the cantilever motion. Furthermore the phase difference provides a method for approaching the surface other than or in addition to the conventional close approach methods and one in which due to the extremely small mass of the telescoping nanotube the response time to any given change is orders of magnitude faster than that which must move the comparatively massive cantilever structure. In addition the motion of the telescoping nanotube may itself provide oscillating means which interacts with the surface in place of the oscillating motion of the cantilever thus permitting much improved response and speed of the AFM system. FIG. 2g shows a variation of the 2f method and means in which an electrical or electromagnetic wave 224 (in the range of a few hertz to terahertz) is propagated through the cantilever 236 and down the tip 204, 206. If the wavelength(s) correspond to the resonant wavelength of any structure(s) in the system it will resonate the structures 204 and/or 206. Any wavelengths 226 that don't match a structure 204, 206 will be reflected back to the source 215. In this way by applying a range of wavelengths a best resonance frequency will be determined. Any interaction with a surface, or change in mass on the resonant structure e.g. 206 can be measured as a shift in the resonant frequency 224 or wavelength via the reflection wave 226. This incident or drive wave 234 shown in 228 has a reflection wave 232 whose amplitude depends on the Q of a resonant structure 204, or 206 and the match of actual resonant frequencies of the structure to the applied frequencies. This method may also be used to determine the shift in resonant wavelength by nanotubes interacting with materials added or removed, attraction or repulsion to surfaces, chemical reactions which add or subtract material, chemical bonds between the nanotube or material thereon and other materials, gas density, temperature, fluid viscosity and other effects which can shift or effect the resonant wavelength of a nanotube. Furthermore the above embodiment in which the resonant frequency of the nanotube is determined by the reflected energy may be used entirely in replacement of a cantilever to make an ultrahigh performance AFM, TUNA or STM in which the tip can be motionless and rigid or resonant and dynamic within a very narrow time and at the same location on the sample.

When the nanotube tip 102 is made to touch or slightly penetrate a volume to target region or the surface or wall face as in FIG. 3b, 321 some material may be picked up by the tip 102 and will have the effect of lowering the fundamental frequency $\omega_1$ of the tip 102. This material volume may be estimated from the penetration into the material and mass may be measured by the shift downward in the fundamental frequency or delta FIG. 3b, 324, thus yielding the density of the new mass and pointing to or precisely defining its constituent material. As a result of the latter interaction tip mass may be lost and 324 becomes a positive shift or increase in frequency and thus by the consequent hardness and toughness required to fracture the nanotube determine the constituent material class of the material in question i.e., a material among those in the class such as diamond, sapphire, boron nitride etc. Further the nanotube may be used to directly transfer materials including fluids from one area or structure to another such as from one DNA source (cell, virus, gene or reservoir) to a target cell or chemical and/or electrochemical array or reaction structure. Resonance frequency shift tests as above can determine how much material is picked up by the nanotube and how much has been deposited.

Mechanical motion imparted to the nanotube tip end can also be used to machine shapes and holes into materials at specific sites and the results include reentrant machined shapes. The motion can also be used to disrupt molecular bonds and accelerate or inhibit chemical and biochemical reactions. In particular the telescoping motion of the multiwall nanotube as depicted in 2f can be used to drill or penetrate a surface both dislodging material there from and clearing the hole formed by the repeated hammering or drilling action of the extension and retraction of the nanotube to different and increasing depths due to the drive voltage amplitude of FIG. 2f, 222 and/or the approach of the cantilever assembly to the surface. Catalytic or biochemical material adhering to or incorporated into the nanotube may be used to selectively and intermittently control chemical processes in organic and inorganic volumes, structures and systems. Furthermore the rapid telescoping action and/or side to side action of the multiwall nanotube may be used to create nanobubbles in liquids which can be used to induce local changes or atomic level jets capable strong interactions with other materials, or high local mixing or sonoluminescence.

FIG. 2g shows the elements of a multi-wall nanotube (MWNT) 240 which has been prepared by removing different layers in order to create different diameter sections with lengths adjusted to have distinct and independent resonate frequencies (for oscillations orthogonal to the vertical axis of the MWNT). This sectioned MWNT (SMWNT) 240 is then mounted on a rigid member 238 above which is another member 239 on which a voltage 220 can be placed and varied in any fashion. This voltage is such that the SMWNT which is free to move being secured only by the outside wall is attracted because of the voltage difference maintained between 238 (electrically connected to SMWNT) and 239. In this way the SMWNT can be made to oscillate vertically and provide for a resonant interaction between the SMWNT 240 and the target surface 242. The SMWNT 240 can also be driven to oscillate by direct excitation at or near resonant frequencies of one or more segments by application of the drive voltage waveform 222 which may be a superposition of one or more resonant drive frequencies and differential phases therein as described in 4 below.

Figure 3:
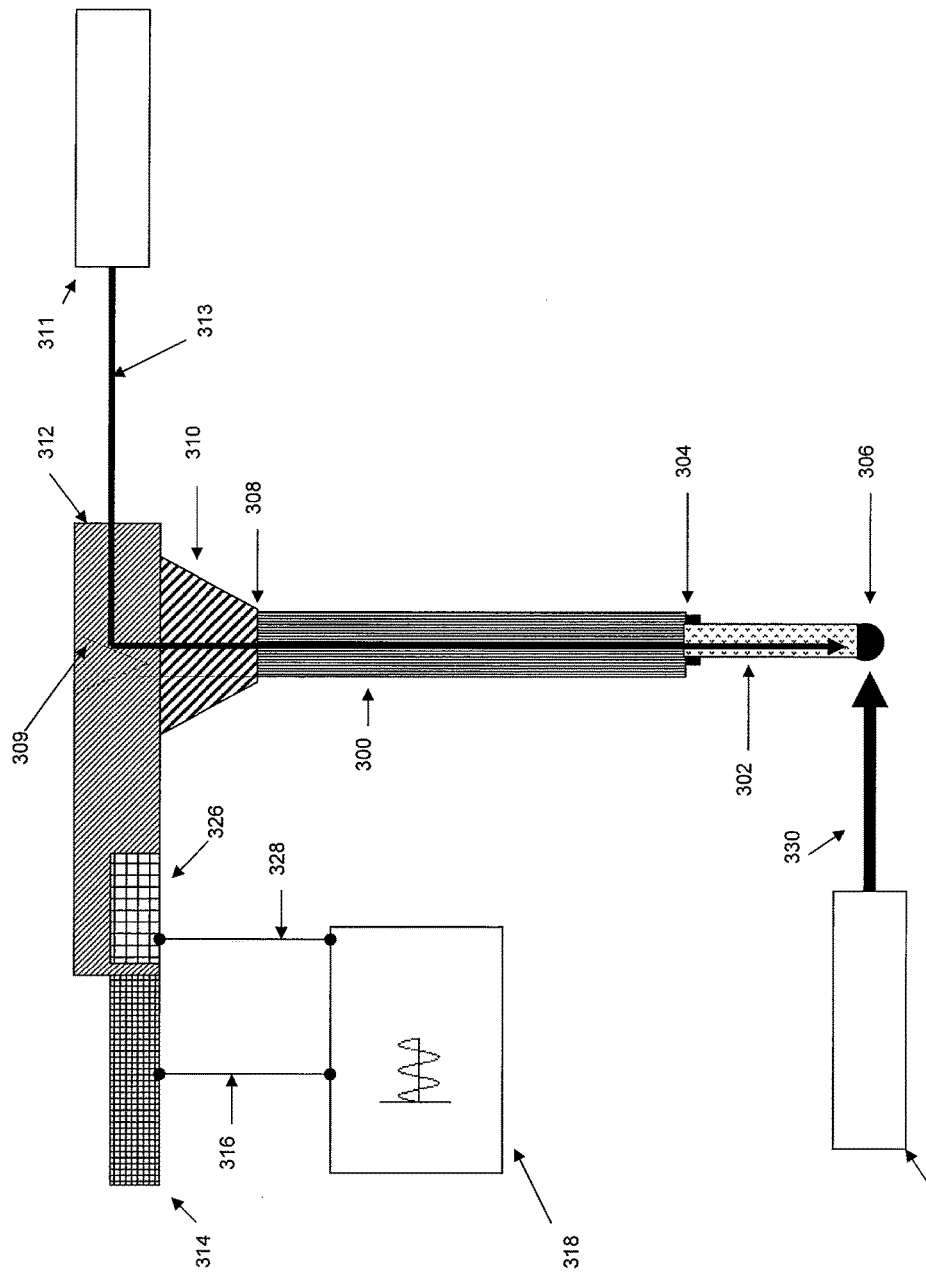
FIG. 3 depicts an AFM cantilever and tip assembly 312, 308, 300, 302 coupled to piezoelectric actuator 314 connected by 316 to nanotube resonant drive source 318. There is a second orthogonal piezoelectric actuator 326 and connection 328 to the drive source 318. It also includes single wall nanotube 302 to multiwall nanotube 300 bond 304 and end material 306. Light source 329 and light beam 330 deliver photons to end material 306. Alternate light source 311, beam 313 cantilever end 312, reflector surface 313 deliver photons to end material 306

As shown in FIG. 3 and based on methods well known in the industry materials such as metals, gases, semiconductors, isotopes of the latter material classes and including copper, hydrogen, deuterium, tritium, helium, phosphorous, uranium, plutonium, americium, polonium, iron, nickel, gold, indium, niobium, platinum, palladium and silver can be incorporated into the interior of the nanotube. Heating the nanotube can draw interior metals from two nanotubes to create (weld) 304 a bond between them. Metal may also be drawn out to the end of the nanotube 306. If silver (with a negative index of refraction and low electrical resistance) is incorporated and drawn out the end of the nanotube as shown in 306 it can serve to promote electron or photon transport into or out of the nanotube tip end, through any secondary nanotube 304 and into a diode detector 308 for photons or plasmons on the main shaft of the tip assembly 310. Alternately an electron source, emitter or channel for photons may be structured at 310 and couple electrons, photons or plasmons into the nanotube structure at 308.

FIG. 3a is an embodiment in which two test or reference structures 320 and 319 provide known characteristics (sidewall angles) whose purpose is the calibrate the sidewall system. These structures are used in conjunction with specific measurement steps including but not limited to those detailed in FIGS. 5,6, and 7 herein.

FIG. 3b is a tip structure 300-312 which is resonated by Piezo 314 before and after the nanotube segment 302 is pushed into specimen 320 and removes material 322. Subsequently the new resonant frequency of 302 is determined as the offset 324 and the mass and volume of the material is determined by the frequency shift (downward or lower in frequency) and the density (material in given volume) used to predict the material composition.

Figure 3C:
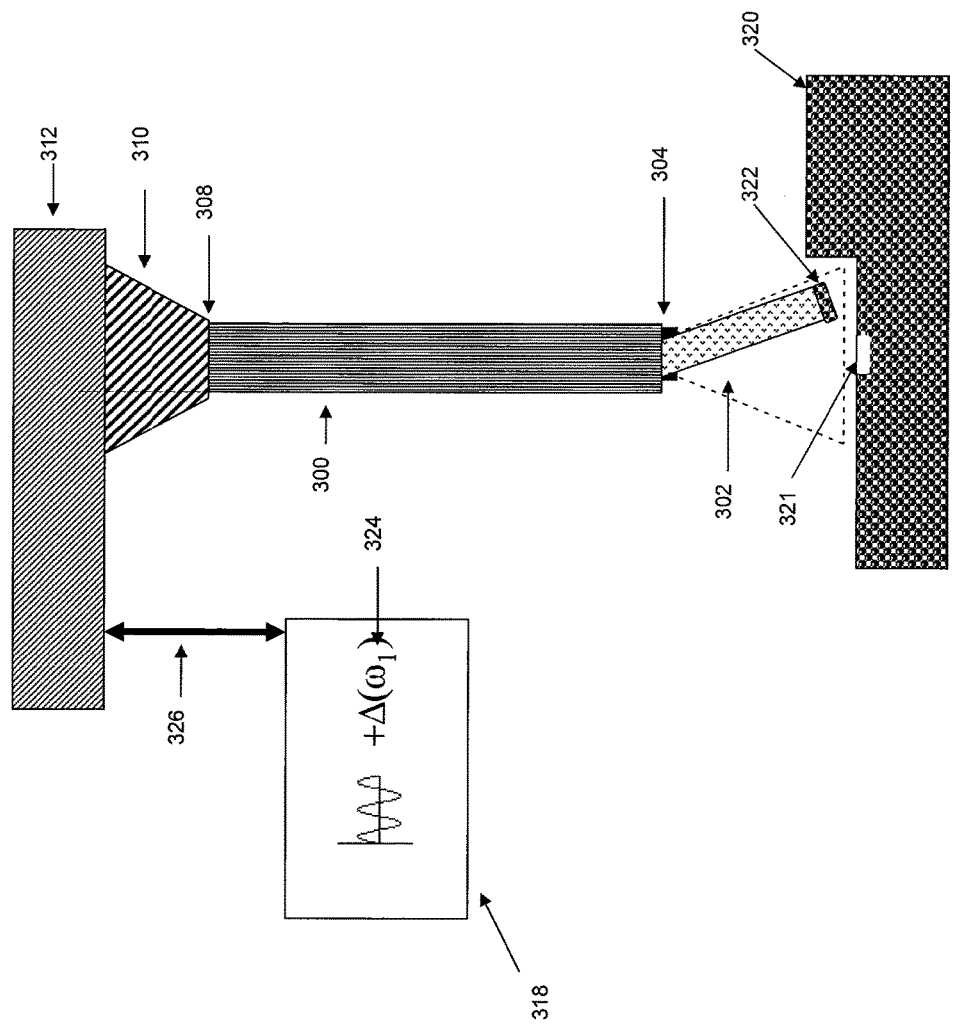
FIG. 3c also shows the elements of FIG. 3 and FIG. 3b along with bidirectional connection 326.

FIG. 3c is the same as 3b above except that the resonant drive 314 is directly electrically coupled to the nanotube.

Figure 3D:
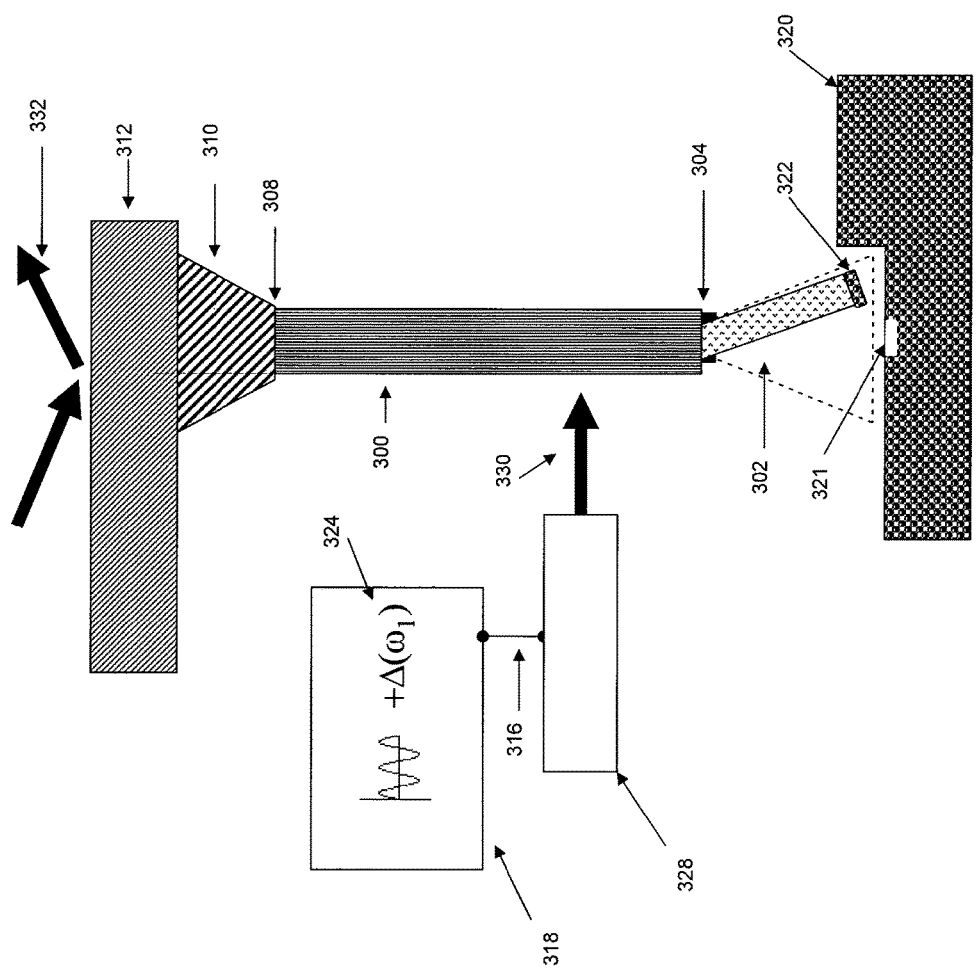
FIG. 3d shows elements of FIG. 3 and FIG. 3b with modulated light source 328 with light output 330, modulated by the output of 318 through connection 316 to excite vibration in the nanotube 302 and/or 300 this modulated source 328 may deliver its output to cantilever 312 serving both excitation to 302 and/or 300 and detection of cantilever 312 deflection to support common AFM systems (not shown).

FIG. 3d is the same as 3c and 3b above except that the resonant drive is provided by light source 328 and light beam 330 which excites the nanotube 300 and 302 directly.

FIG. 3e shows a segmented nanotube structure 334 and 336 in which the segment 334 has been treated such that its fluid characteristics (to reject or attract any given fluid type e.g. aqueous or oil) are opposite those of the segment 336 from well 332. Thus the length of 334 precisely meters the fluid pick-up and transported by the structure 308, 310, 312, 334, and 336. The methods above can be further used determine the mass of the fluid (and given the precise metering volume) the density and material type. Finally the amount of material deposited at any target spot 319 can be determined by the same means and the amount left can further be metered by the resonant amplitude of 334. Further embodiments may use more than two segments with different fluid characteristics to support many fluid types and differential fluid amounts. As an example alternating segments that attract and repel any given fluid with different segment lengths can meter fluid from the well in specific variable amounts for transport to different areas.

FIG. 4 waveform set 400 shows two different drive waveforms which would sum together as shown in pink in 404 and 410 to make a complex sum waveform 406, 408, and 412,414 respectively. Each individual frequency component is in the best embodiment each individual frequency is a sine wave whose phase is adjusted with respect to the other frequencies to obtain any given nanotube tip end loci.

FIG. 4a is an embodiment of the nanotube structure in FIG. 3 in which the silver tip end 306 is inserted into a recess in the specimen which has been illuminated by electromagnetic radiation 410. The nanotube tip end is resonated and along the locus of motion collects photons into the nanotube sub-assembly and up into the main tip shaft body 310 where a local photodiode produces an output as a function of the collected photons. Electromagnetic energy can also be directed from above, at an angle or by any combination of above, below and angle. Electromagnetic energy can be provided from any including any or all of lasers, flash lamps, light emitting diodes, microwave sources, thermal sources, florescence, Raman, phosphorescence or ambient.

Figure 5:
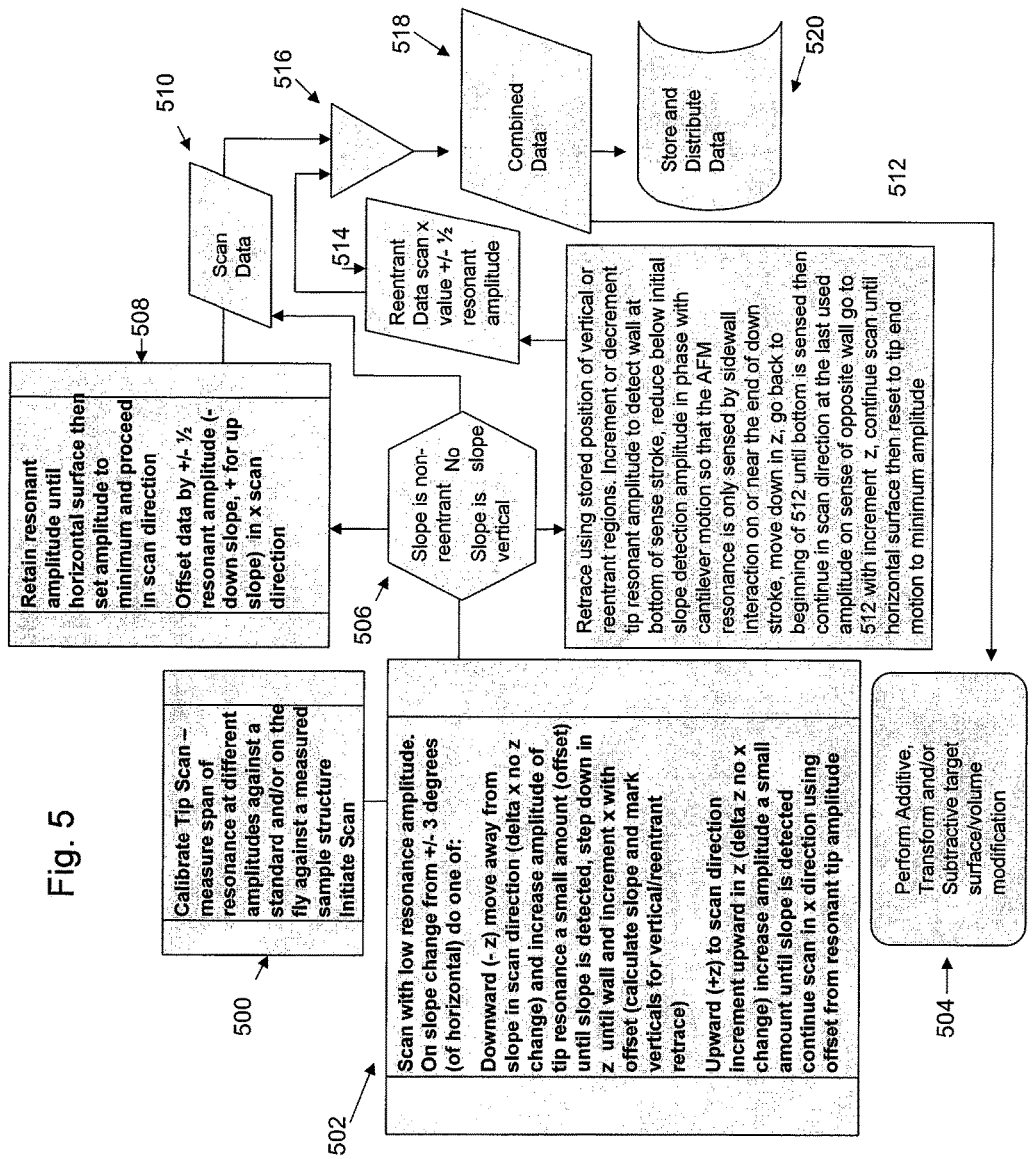
FIG. 5 shows a typical control program flow chart in accordance with the invention.
Figure 6:
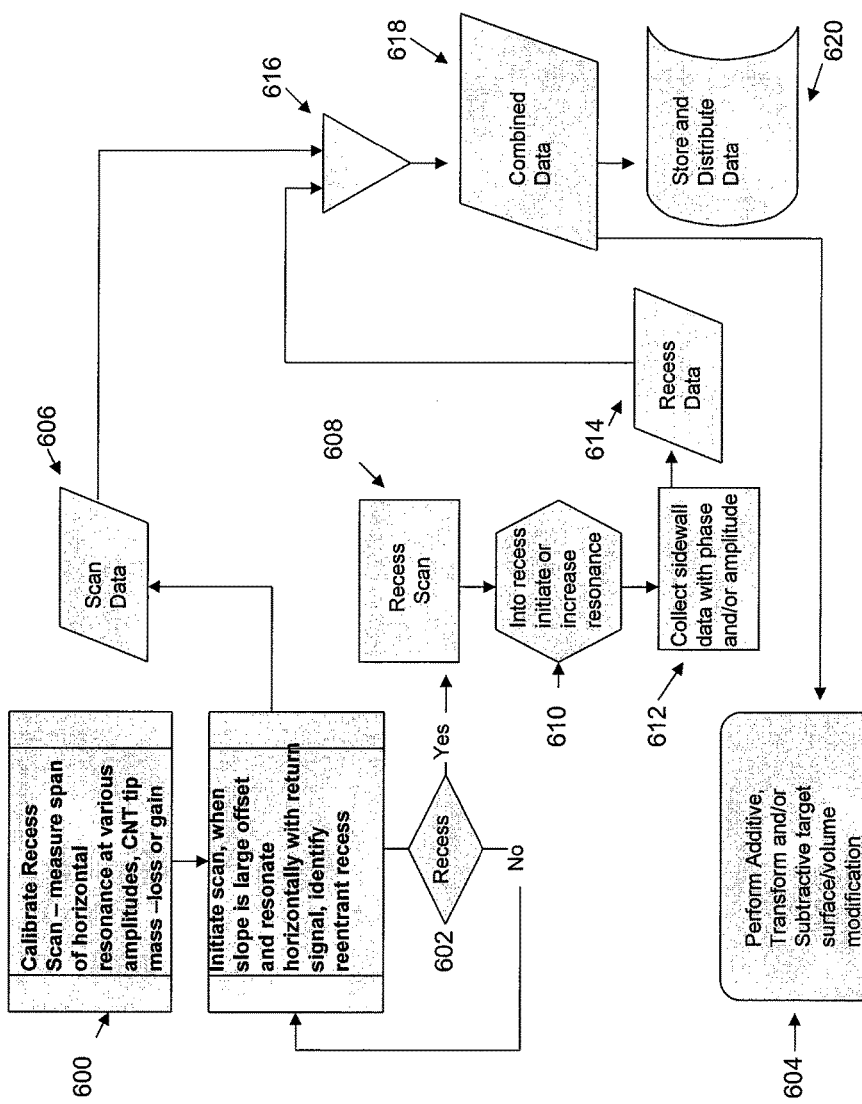
FIGS. 6 and 7 show additional control program flow charts in accordance with the invention.
Figure 7:
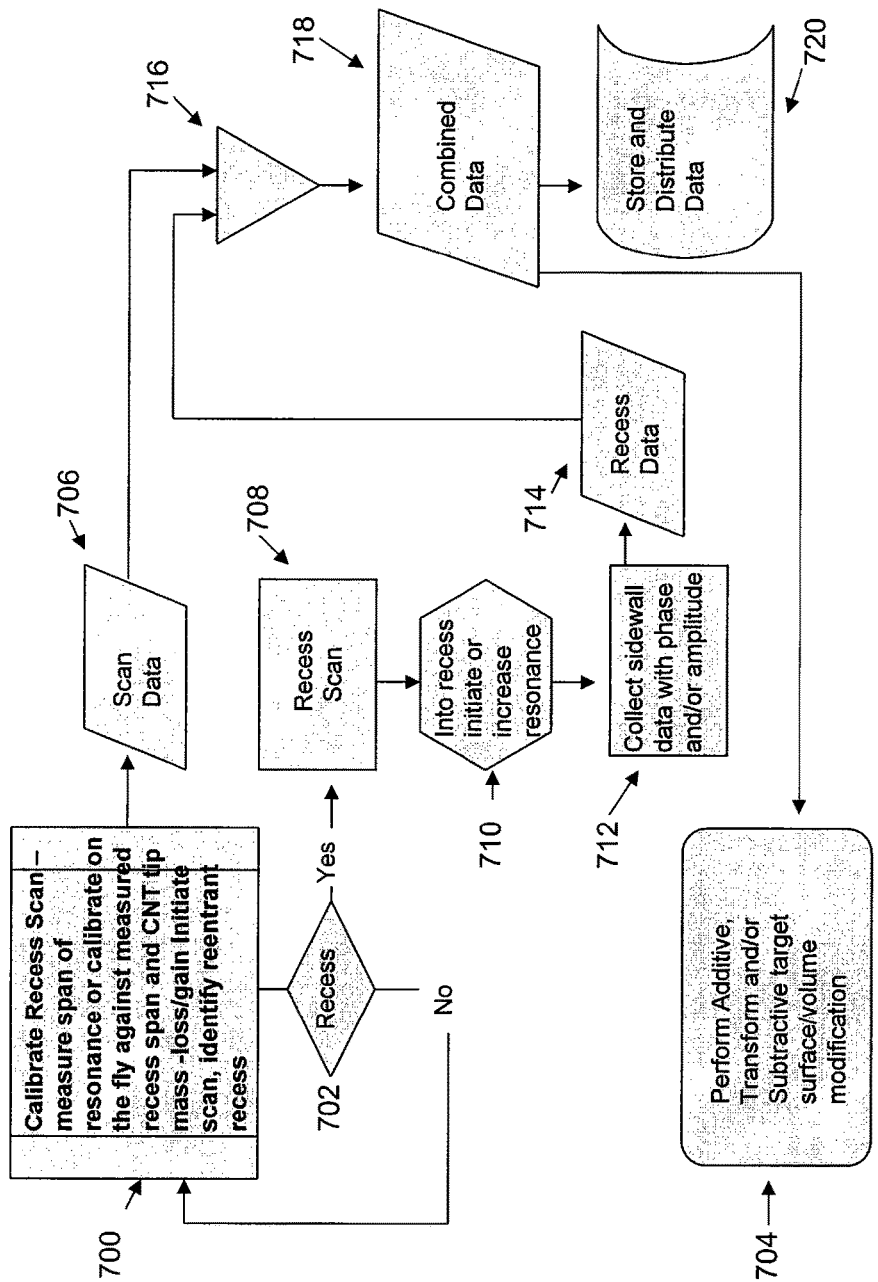

In operation of all embodiments the control system FIG. 5 outline the flow chart that works through 11 logical steps, and data stores 500, 502, 504, 506, 508, 510, 512, 514, 516, 518, and 520. In 500 the recess calibration logically controls the operation of measuring the reference structures 319, 320 or the local structure as characterized by a scan on the object at or near the location for sidewall measurement so as to characterize the offset of the resonant scan from the rest position of the nanotube tip end. Calibration may also be performed on the resonant frequency by locating a fixed distance from an edge and increasing the resonant amplitude until the edge is detected then reducing just below the detection level and changing the frequency until the edge is detected, if no frequency can detect the edge then the original frequency is the core resonant frequency. The same routine also characterizes the mass of the nanotube 302 tip end and the density of any material adhering to the nanotube 302 tip end by comparison to the original or earliest resonant frequency characterization for the particular tip. Characterization must proceed as described above for each distinct resonant frequency range. After calibration the routine then initiates an area scan at no or minimal resonant amplitude and identifies any recesses that might be vertical or reentrant. Data collected is then stored at 506 and a decision is made on any given recess meeting the vertical/reentrant criteria at logical decision point 502. If no reentrant or vertical recess is detected the decision process 502 returns to 500 where additional scan data may be collected. If a reentrant (or vertical) recess is located the operation proceeds to recess scan 508, here a scan is directed by module 510 and the recess is scanned by a process 512 in which amplitude and phase collects data about sidewalls in any directions along which a wall may exist (based on the scan data passed from process 500 along with the recognized reentrant recess. Recess data 514 is then combined with scan data 516 and passed to a combined data process 518 and thence to a data store and distribution process 520. Instructions and data from 518 may also be passed to secondary operations and processes 504 including the modification and/or material identification of the specimen. The detailed process is shown and annotated in FIG. 5. In FIG. 6 the steps for another embodiment of the scan processing, modification and control are detailed. In FIG. 7 yet another embodiment of the scan processing, modification, analysis and control are detailed. Any of the latter methods (5, 6, or 7) may be combined, modified in whole or in part to produce measurements, modifications or analysis.

In some embodiments, the first line is scanned with carbon nanotube in low amplitude and any vertical points are saved in x (as up going or down going, i.e. delta z on x points on either side of the vertical point is either positive z increasing or negative z decreasing) and define the regions in x of the down and up sidewall detection on the backstroke. The backstroke x scan is only slowed at the known vertical points (or an offset short of the vertical point related to the uncertainty of the x position on backstroke). At each vertical point the carbon nanotube is incremented up (or down as appropriate) on reaching the vertical point and its vibration amplitude is increased until the sidewall is sensed. The operation is repeated for each scan line which has vertical points. If no vertical points then y is incremented as defined in the scan parameters and the next line scanned on backstroke and so on until the extant in y is completed.

While the invention has been described with respect to specific embodiments, one skilled in the art will recognize that numerous modifications are possible. One skilled in the art will also recognize that the invention provides a number of advantageous techniques, tools, and products, usable individually or in various combinations. These techniques, tools, and products include but are not limited to:

Use of swept frequency near wall determination of carbon nanotube resonance frequency in SPM and related applications.

Use of resonating carbon nanotube in SPM and related applications.

Use of nanotubes in general in SPM and related applications.

Use of step nanotube as device for fluid application. The lowest step or other steps can be, e.g., hydrophilic or hydrophobic. A step can also attracts organics including lipids and oils, or repel organics including oils and lipids. A step or nanotube can be treated chemically and/or mechanically, and/or thermally to be hydrophilic or hydrophobic.

A tip structure in which some portion of the structure is made so as to attract certain fluids and other portions of the tip repel certain fluids.

A method for controlling fluid delivery in which a specific surface area is configured to attract and retain a fluid while other portions of the structure repel the given fluid.

Use of resonance of the nanotube tip by up to 4 nm to keep tip from adhering surface and slopes.

Use of one or more concentric carbon nanotubes in SPM and related applications

Use of multiple resonant drive for varying diameter nanotubes.

Use of nanotube with variable amplitude, phase, frequency to modulate the vertical z detection system in a SPM.

A measurement relative to the central access of a SPM probe made without any motion by the probe assembly.

A measurement relative to the central access of a SPM made when motion of the probe assembly is confined to one direction in continuous motion over the surface of the sample.

Differential additive and subtractive motion of the tip end by phase control of individual nanotube sections.

Cumulative motion up to 100 microns and up to 1 micron per segment.

Motion as above, sensing force or tunnel current or both.

Placing conductive plate over rear of MWNT (held at ground or alternately at some desired offset voltage with respect to the specimen) to permit driving the nanotube extension and using the rebound to make an AFM and/or TUNA to sense the surface.

In the above configuration, obtaining the resonant frequency by use of the reflected component of the drive wave at any series of drive frequencies.

Thus, although the invention has been described with respect to specific embodiments, it will be appreciated that the invention is intended to cover all modifications and equivalents within the scope of the following claims.

What is claimed is:

1. A scanning probe system comprising:
a rigid probe subassembly configured for translation;
a tip end nanotube subassembly wherein the tip end nanotube subassembly
is mounted directly to the rigid probe subassembly without an intervening cantilever,
is configured for vibration, and
comprises a multi-wall nanotube having multiple coaxial nanotube walls of different diameters wherein at least one of the walls can slide relative to the other to provide a configuration having a stepped diameter, and wherein each of the walls has a resonant frequency different from a resonant frequency of each other of the walls; and
a motion producing means acting on all or some portions of the nanotube subassembly to induce vibration in the nanotube subassembly in a direction transverse to an axis of the multi-wall nanotube, wherein the motion producing means is operable to induce the vibration at different frequencies including the resonant frequencies of different ones of the walls.

2. The scanning probe system of claim 1, and further comprising an electromagnetic energy collection or emission means at the nanotube end.

3. The scanning probe system of claim 1, and further comprising a photodiode disposed to detect radiation from a specimen's surface received through the tip end nanotube subassembly.

4. The scanning probe system of claim 1 in which acoustic energy is used to move some or all of the tip end nanotube subassembly.

5. The scanning probe system of claim 1 in which multiple frequencies of acoustic energy with controlled and variable phase relationships coupling to multiple portions of the tip are used to create motions of the tip.

6. The scanning probe system of claim 1 in which orthogonal acoustic drivers are used to control the motion of the tip end nanotube subassembly.

7. The scanning probe system of claim 1 wherein the translation of the rigid probe subassembly is controllable to cause a nanotube tip of an innermost wall of the multi-wall nanotube to touch a target surface resulting in material from the target surface being taken up by the tip end nanotube subassembly, and wherein the scanning probe system further comprises measuring means to measure an effect of the material on the resonant frequency of the innermost wall.

8. The scanning probe system of claim 1, and further comprising one or more reference structures with known geometries that are used to calibrate a locus of motion of the tip end nanotube subassembly.

9. The scanning probe system of claim 1 in which the motions induced into the tip end nanotube subassembly provides a tip end locus of motion suitable for measuring reentrant structures.

10. The scanning probe system of claim 1 in which the motion induced into the tip end nanotube subassembly provides a tip end locus of motion suitable to change a molecular material by mechanical shear.

11. The scanning probe system of claim 1 in which the motion induced into the tip end nanotube subassembly provides a tip end locus of motion suitable to catalyze a chemical or biochemical reaction.

12. The scanning probe system of claim 1, and further comprising an electron source configured to emit electrons from the tip end nanotube subassembly.

13. The scanning probe system of claim 1, and further comprising means for controlling the longitudinal position of at least one of the nanotube walls that can slide relative to the other.

14. The scanning probe system of claim 1 wherein the multi-wall nanotube is mounted to a first end of a tip structure and a second end of the tip structure is mounted to the rigid probe subassembly.

15. A scanning probe system comprising:
a support structure;
a tip end nanotube subassembly mounted to the support structure wherein the tip end nanotube subassembly comprises a multi-wall nanotube having multiple coaxial nanotube walls of different diameters wherein
  at least one of the walls is fixedly mounted to the support structure, and
  at least one other of the walls can slide relative to the fixedly mounted wall so that an end of the other wall can move toward and away from the support structure, and
  each one of the walls has a resonant frequency different from a resonant frequency of each other of the walls; and
a motion producing means acting on all or some portions of the nanotube subassembly to drive an oscillation in the nanotube subassembly in a direction along an axis of the multi-wall nanotube wherein the other wall oscillates via longitudinal motion toward and away from the support structure while the support structure does not oscillate.

16. The scanning probe system of claim 15 wherein the support structure comprises a rigid support to which the tip end nanotube subassembly is rigidly mounted.

17. The scanning probe system of claim 15 wherein the support structure comprises:
a rigid support; and
a flexible cantilever mounted to the rigid support, the tip end nanotube subassembly being mounted to the cantilever.

18. The scanning probe system of claim 15 wherein the motion producing means is further configured to induce vibration in a direction transverse to the axis of the multi-wall nanotube at different frequencies including the resonant frequencies of different ones of the walls.

19. A scanning probe system comprising:
a cantilever;
a tip end nanotube subassembly mounted to the cantilever, the nanotube subassembly comprising a plurality of coaxial nanotube segments of different diameters, the nanotube segments being fixedly longitudinally distributed to provide a configuration having a stepped diameter, wherein each one of the nanotube segments has a resonant frequency different from a resonant frequency of each other of the nanotube segments; and
a motion producing means acting on all or some portions of the nanotube subassembly to induce vibration in the tip end nanotube subassembly in a direction transverse to an axis of the nanotube segments, wherein the motion producing means is operable to induce the vibration at different frequencies including the resonant frequencies of different ones of the nanotube segments.

20. The scanning probe system of claim 19 wherein the nanotube subassembly is mounted to a first end of a tip structure and a second end of the tip structure is mounted to the cantilever.

21. A scanning probe system comprising:
a cantilever;
a tip end nanotube subassembly mounted to the cantilever, the nanotube subassembly comprising a multi-wall nanotube having at least first and second coaxial nanotube walls fixed to each other, wherein
  the first nanotube wall has a larger diameter and a shorter length than the second nanotube wall,
  the first nanotube wall has a different resonant frequency from the second nanotube wall, and
  at least a portion of the first nanotube wall surrounds at least a portion of the second nanotube wall so that at least a portion of the second nanotube wall extends axially beyond an end of the first nanotube wall; and
a motion producing means to induce vibration in the tip end nanotube subassembly in a direction transverse to an axis of the multi-wall nanotube, wherein the motion producing means is operable to induce the vibration at different frequencies including the resonant frequencies of the first and second nanotube walls.

22. The scanning probe system of claim 21 wherein the multi-wall nanotube is mounted to a first end of a tip structure and a second end of the tip structure is mounted to the cantilever.

* * * * *